(12) United States Patent
Bassi et al.

(10) Patent No.: US 12,445,842 B2
(45) Date of Patent: Oct. 14, 2025

(54) APPARATUSES, COMPUTER-IMPLEMENTED METHODS, AND COMPUTER PROGRAM PRODUCTS FOR MANAGING ACCESS OF WIRELESS NODES TO A NETWORK

(71) Applicant: Honeywell International Inc., Charlotte, NC (US)

(72) Inventors: Atul Bassi, Bengaluru (IN); Tarun Gupta, Bengaluru (IN); Anubhav Misra, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 404 days.

(21) Appl. No.: 18/055,117

(22) Filed: Nov. 14, 2022

(65) Prior Publication Data
US 2024/0163668 A1    May 16, 2024

(51) Int. Cl.
*H04W 12/065* (2021.01)

(52) U.S. Cl.
CPC ................................. *H04W 12/065* (2021.01)

(58) Field of Classification Search
CPC .................................................. H04W 12/065
See application file for complete search history.

(56) References Cited

U.S. PATENT DOCUMENTS

| | | | | |
|---|---|---|---|---|
| 6,163,272 A * | 12/2000 | Goode | ............... | H04N 7/17354 348/E7.071 |
| 6,847,644 B1 * | 1/2005 | Jha | ................ | H04L 1/0061 370/392 |
| 6,865,680 B1 * | 3/2005 | Wu | ................ | H04L 67/04 713/184 |
| 7,185,067 B1 * | 2/2007 | Viswanath | ......... | H04W 28/088 709/219 |
| 7,373,508 B1 * | 5/2008 | Meier | ................ | H04W 12/065 713/168 |
| 7,590,579 B2 * | 9/2009 | Data | ................ | G06Q 40/06 705/36 R |
| 7,870,389 B1 * | 1/2011 | Leung | ................ | H04L 9/16 713/153 |
| 8,019,082 B1 * | 9/2011 | Wiedmann | ......... | H04W 12/065 370/254 |
| 8,064,882 B2 * | 11/2011 | Shatzkamer | ......... | H04W 12/08 455/414.1 |

(Continued)

*Primary Examiner* — Aravind K Moorthy
(74) *Attorney, Agent, or Firm* — ALSTON & BIRD LLP

(57) ABSTRACT

Embodiments of the disclosure provide improvements for managing access of nodes, including wireless nodes, to a network including operational technology device(s) (e.g., a wireless OT network). Some embodiments include detecting a node from at least one message communication over a wireless OT network, authenticating node identification information that uniquely identifies the node, confirming that the node is permissioned to access the wireless OT network by at least validating authentication information associated with the node, confirming that the node is attempting an authorized action by at least validating authorization information associated with the at least one message communication, and assigning an access indicator based at least in part on the authenticating of the node identification information, the validating of the authentication information, and the validating of the authorization information.

18 Claims, 16 Drawing Sheets

(56) References Cited

U.S. PATENT DOCUMENTS

| | | | | |
|---|---|---|---|---|
| 8,478,266 B1* | 7/2013 | Zhou | H04W 60/00 | 713/168 |
| 8,751,624 B1* | 6/2014 | Jacobson | H04L 43/06 | 709/224 |
| 9,137,654 B1* | 9/2015 | Qu | H04W 8/12 | |
| 9,521,606 B1* | 12/2016 | Costa | H04L 63/083 | |
| 9,807,819 B1* | 10/2017 | Zhu | H04W 92/02 | |
| 10,020,994 B2* | 7/2018 | Cuni | H04L 43/12 | |
| 10,032,039 B1* | 7/2018 | Milman | G06F 21/6209 | |
| 10,044,787 B1* | 8/2018 | Frazier | H04L 67/02 | |
| 10,084,826 B1* | 9/2018 | Irwan | H04L 9/0637 | |
| 10,355,962 B2* | 7/2019 | Chandrashekar | H04L 41/12 | |
| 10,476,906 B1* | 11/2019 | Siddiqui | H04L 63/18 | |
| 10,505,972 B2* | 12/2019 | Thomas | H04L 63/1416 | |
| 10,542,423 B1* | 1/2020 | Chang | H04W 12/64 | |
| 10,728,262 B1* | 7/2020 | Vaswani | G06F 21/62 | |
| 10,911,465 B1* | 2/2021 | Au | H04L 63/20 | |
| 11,025,590 B1* | 6/2021 | Kovenat | H04L 63/20 | |
| 11,140,179 B1* | 10/2021 | Infante-Lopez | H04L 63/1425 | |
| 11,388,653 B2* | 7/2022 | Henttonen | H04W 48/12 | |
| 11,494,128 B1* | 11/2022 | Pabon | G06F 3/0665 | |
| 11,606,333 B1* | 3/2023 | Sajassi | H04L 61/103 | |
| 11,770,388 B1* | 9/2023 | Laconic | H04L 67/12 | 726/23 |
| 11,770,410 B1* | 9/2023 | Warmenhoven | H04L 9/0894 | 726/22 |
| 11,803,658 B1* | 10/2023 | Jonak | G06F 21/6245 | |
| 11,818,276 B1* | 11/2023 | Bespalovas | H04L 9/3297 | |
| 11,934,667 B1* | 3/2024 | Rubira Branco | G06F 3/0659 | |
| 11,973,640 B1* | 4/2024 | Wang | H04L 41/064 | |
| 11,985,055 B1* | 5/2024 | Saad | H04L 45/122 | |
| 2003/0002517 A1* | 1/2003 | Takajitsuko | H04L 49/506 | 370/428 |
| 2003/0237002 A1* | 12/2003 | Oishi | H04L 63/08 | 726/10 |
| 2004/0085347 A1* | 5/2004 | Hagarty, Jr. | H04L 41/12 | 715/735 |
| 2005/0079869 A1* | 4/2005 | Khalil | H04L 63/08 | 455/411 |
| 2005/0097360 A1* | 5/2005 | Chu | H04L 63/0236 | 726/4 |
| 2005/0181765 A1* | 8/2005 | Mark | G06Q 10/10 | 455/410 |
| 2005/0220048 A1* | 10/2005 | Lee | H04L 67/51 | 370/328 |
| 2006/0053281 A1* | 3/2006 | Andersson | H04L 63/0442 | 713/159 |
| 2006/0078119 A1* | 4/2006 | Jee | H04L 63/08 | 380/247 |
| 2006/0147043 A1* | 7/2006 | Mann | H04L 63/08 | 380/270 |
| 2006/0236363 A1* | 10/2006 | Heard | H04L 9/3228 | 726/1 |
| 2007/0043940 A1* | 2/2007 | Gustave | H04L 63/0471 | 713/150 |
| 2007/0117563 A1* | 5/2007 | Terry | H04W 76/10 | 455/434 |
| 2007/0192137 A1* | 8/2007 | Ombrellaro | G06Q 10/10 | 600/300 |
| 2007/0206557 A1* | 9/2007 | Iyer | H04L 47/824 | 370/338 |
| 2008/0184332 A1* | 7/2008 | Gerkis | H04W 12/08 | 726/1 |
| 2008/0222417 A1* | 9/2008 | Downes | G06F 21/36 | 713/172 |
| 2010/0088400 A1* | 4/2010 | Andreasen | H04W 8/26 | 709/245 |
| 2010/0325720 A1* | 12/2010 | Etchegoyen | H04L 63/101 | 726/17 |
| 2011/0231914 A1* | 9/2011 | Hung | H04W 12/30 | 726/7 |
| 2012/0034932 A1* | 2/2012 | Zhu | H04W 64/003 | 455/456.1 |
| 2012/0130958 A1* | 5/2012 | Kalach | G06F 16/13 | 707/687 |
| 2012/0238287 A1* | 9/2012 | Scherzer | H04W 72/20 | 455/422.1 |
| 2012/0317491 A1* | 12/2012 | Wong | H04L 41/5096 | 715/736 |
| 2013/0023237 A1* | 1/2013 | Meredith | H04W 12/065 | 455/411 |
| 2013/0196647 A1* | 8/2013 | Raleigh | H04M 15/00 | 455/418 |
| 2013/0200142 A1* | 8/2013 | Larson | G06F 16/27 | 235/375 |
| 2014/0044135 A1* | 2/2014 | Sankaralingam | H04L 45/745 | 370/401 |
| 2014/0143856 A1* | 5/2014 | Wu | H04W 12/065 | 726/16 |
| 2014/0201531 A1* | 7/2014 | Toy | H04W 12/065 | 713/168 |
| 2014/0254548 A1* | 9/2014 | Hughes | H04W 12/062 | 370/331 |
| 2014/0342661 A1* | 11/2014 | DeLuca | H04W 12/08 | 455/39 |
| 2015/0071141 A1* | 3/2015 | Vallabhu | H04W 52/0216 | 370/311 |
| 2015/0078201 A1* | 3/2015 | Chen | H04L 45/66 | 370/254 |
| 2015/0082382 A1* | 3/2015 | Maguire | H04L 63/08 | 726/3 |
| 2016/0149880 A1* | 5/2016 | Paczkowski | H04L 63/101 | 726/4 |
| 2016/0182296 A1* | 6/2016 | Sharp-Paul | H04L 41/0894 | 709/224 |
| 2016/0212150 A1* | 7/2016 | Thubert | H04L 63/126 | |
| 2016/0227543 A1* | 8/2016 | Flammer, III | H04W 24/08 | |
| 2016/0253118 A1* | 9/2016 | Hori | G06F 21/554 | 711/102 |
| 2016/0269908 A1* | 9/2016 | Richards | H04L 63/0853 | |
| 2016/0381068 A1* | 12/2016 | Galula | G07C 5/0816 | 726/23 |
| 2017/0013005 A1* | 1/2017 | Galula | H04L 63/1425 | |
| 2017/0046187 A1* | 2/2017 | Tsirkin | G06F 9/45558 | |
| 2017/0078322 A1* | 3/2017 | Seiver | H04L 63/1433 | |
| 2017/0134954 A1* | 5/2017 | Speight | H04L 61/5014 | |
| 2017/0141927 A1* | 5/2017 | Apte | H04L 9/3263 | |
| 2017/0164200 A1* | 6/2017 | Näslund | H04W 12/069 | |
| 2017/0188232 A1* | 6/2017 | Raleigh | H04L 63/083 | |
| 2017/0265076 A1* | 9/2017 | Richards | H04L 43/16 | |
| 2017/0272455 A1* | 9/2017 | Black | H04W 12/069 | |
| 2017/0272943 A1* | 9/2017 | Valasek | G06F 21/575 | |
| 2018/0033226 A1* | 2/2018 | Robertson | H04L 63/0876 | |
| 2018/0082069 A1* | 3/2018 | Cunico | G06F 21/604 | |
| 2018/0109623 A1* | 4/2018 | Zibuschka | H04W 12/065 | |
| 2018/0121371 A1* | 5/2018 | Lillibridge | G06F 9/50 | |
| 2018/0160305 A1* | 6/2018 | Hughes | H04L 9/0861 | |
| 2018/0302400 A1* | 10/2018 | Covdy | H04L 63/0853 | |
| 2018/0367469 A1* | 12/2018 | Re | G06F 9/468 | |
| 2018/0367499 A1* | 12/2018 | Bansal | H04L 61/30 | |
| 2019/0141527 A1* | 5/2019 | Krishan | H04W 8/04 | |
| 2019/0159026 A1* | 5/2019 | Rezaei | H04L 63/0953 | |
| 2019/0174314 A1* | 6/2019 | Joseph | H04W 12/06 | |
| 2019/0251272 A1* | 8/2019 | Ravizza | G06F 18/23213 | |
| 2019/0253380 A1* | 8/2019 | Bennett | H04L 61/4552 | |
| 2019/0268759 A1* | 8/2019 | Targali | H04L 9/0825 | |
| 2019/0273716 A1* | 9/2019 | Sundarababu | H04L 45/586 | |
| 2019/0319964 A1* | 10/2019 | Smith | H04L 69/22 | |
| 2019/0357119 A1* | 11/2019 | Hong | H04L 1/1614 | |
| 2019/0375373 A1* | 12/2019 | Pepe | H04M 1/724098 | |
| 2019/0377685 A1* | 12/2019 | Raisch | G06F 12/1441 | |
| 2020/0112572 A1* | 4/2020 | Ajayi | H04L 63/20 | |
| 2020/0120083 A1* | 4/2020 | Kaladgi | G06F 21/604 | |
| 2020/0120142 A1* | 4/2020 | Maynard | G06Q 10/067 | |
| 2020/0134240 A1* | 4/2020 | Balakrishna | G06F 3/147 | |
| 2020/0145316 A1* | 5/2020 | Sosthène Enguehard | H04L 47/78 | |
| 2020/0153833 A1* | 5/2020 | Rosenblum | H04W 48/02 | |
| 2020/0278797 A1* | 9/2020 | Bavishi | G06F 3/0656 | |
| 2020/0285593 A1* | 9/2020 | Mayo | G06F 12/126 | |

(56) References Cited

U.S. PATENT DOCUMENTS

| | | | |
|---|---|---|---|
| 2020/0285788 A1* | 9/2020 | Brebner | G06F 18/251 |
| 2020/0293651 A1* | 9/2020 | Meyer | G06F 9/542 |
| 2020/0322286 A1* | 10/2020 | Mehta | H04L 67/104 |
| 2020/0342459 A1* | 10/2020 | Boyle | H04L 63/0876 |
| 2021/0026831 A1* | 1/2021 | Mishra | G06F 16/2358 |
| 2021/0056215 A1* | 2/2021 | Guha | G06F 16/21 |
| 2021/0099464 A1* | 4/2021 | Seaborn | H04L 63/126 |
| 2021/0194752 A1* | 6/2021 | Nadger | H04L 67/10 |
| 2021/0248526 A1* | 8/2021 | Greenberg | G06Q 10/0633 |
| 2021/0263639 A1* | 8/2021 | Lee | G06F 3/0488 |
| 2021/0266346 A1* | 8/2021 | Gordon | H04L 63/0245 |
| 2021/0303441 A1* | 9/2021 | Hazra | G06F 11/3612 |
| 2021/0306853 A1* | 9/2021 | Gundavelli | H04W 36/0038 |
| 2021/0400057 A1* | 12/2021 | Devane | H04L 63/1425 |
| 2022/0021657 A1* | 1/2022 | Jayaraman | H04L 63/04 |
| 2022/0058057 A1* | 2/2022 | Lu | G06F 9/5016 |
| 2022/0067130 A1* | 3/2022 | Dabbs | G06F 21/6218 |
| 2022/0067493 A1* | 3/2022 | Aum | G05B 13/027 |
| 2022/0070048 A1* | 3/2022 | Someya | H04L 41/0816 |
| 2022/0076178 A1* | 3/2022 | Turlapati | G06F 8/71 |
| 2022/0078610 A1* | 3/2022 | Montemurro | H04W 12/68 |
| 2022/0158855 A1* | 5/2022 | Wentz | H04L 9/3247 |
| 2022/0164697 A1* | 5/2022 | Subramaniam | G06N 5/01 |
| 2022/0232460 A1* | 7/2022 | Fu | H04W 12/10 |
| 2022/0269812 A1* | 8/2022 | Baez | G06F 21/50 |
| 2022/0278960 A1* | 9/2022 | Mitchell | H04L 63/0236 |
| 2022/0300527 A1* | 9/2022 | Stein | G06Q 50/265 |
| 2022/0312283 A1* | 9/2022 | Chen | H04W 36/0061 |
| 2022/0322211 A1* | 10/2022 | Maria | H04W 28/06 |
| 2023/0006899 A1* | 1/2023 | Nechushtan | H04L 41/12 |
| 2023/0052252 A1* | 2/2023 | Katzri | H04L 45/74591 |
| 2023/0096692 A1* | 3/2023 | Jacobs | H04W 12/041 380/270 |
| 2023/0106268 A1* | 4/2023 | Venkatesh | H04L 63/102 701/23 |
| 2023/0106828 A1* | 4/2023 | Butcher | G06F 13/4068 710/305 |
| 2023/0114821 A1* | 4/2023 | Thomas | H04L 63/1433 726/23 |
| 2023/0123781 A1* | 4/2023 | Kaimal | H04L 41/0893 726/12 |
| 2023/0216915 A1* | 7/2023 | Jonytis | H04W 40/24 709/204 |
| 2023/0239739 A1* | 7/2023 | Thubert | H04W 84/12 398/115 |
| 2023/0247048 A1* | 8/2023 | Samosseiko | H04L 63/1425 726/23 |
| 2023/0274010 A1* | 8/2023 | S | G06F 21/31 726/5 |
| 2023/0283487 A1* | 9/2023 | Angelo | H04L 9/3278 713/168 |
| 2023/0300108 A1* | 9/2023 | Nedungadi | H04L 12/66 709/245 |
| 2023/0316263 A1* | 10/2023 | Eby | H04L 9/3271 |
| 2023/0344812 A1* | 10/2023 | Sloane | H04L 63/08 |
| 2023/0353575 A1* | 11/2023 | Chandra | H04L 63/08 |
| 2023/0379250 A1* | 11/2023 | Thubert | H04L 45/42 |
| 2023/0394478 A1* | 12/2023 | Fuentes | G06N 20/00 |
| 2023/0403302 A1* | 12/2023 | Shrotri | H04L 63/10 |
| 2023/0409734 A1* | 12/2023 | McCarley | H04W 12/02 |
| 2024/0004982 A1* | 1/2024 | Fang | H04M 1/72463 |
| 2024/0007946 A1* | 1/2024 | Ram | H04L 41/344 |
| 2024/0015506 A1* | 1/2024 | Yapici | H04L 5/0051 |
| 2024/0028986 A1* | 1/2024 | Willardson | G06Q 10/063112 |
| 2024/0036934 A1* | 2/2024 | Vasanad | G06F 9/5077 |
| 2024/0046371 A1* | 2/2024 | Karcher | G06Q 50/08 |
| 2024/0056359 A1* | 2/2024 | Ramanathan | H04L 41/12 |
| 2024/0056446 A1* | 2/2024 | Castellanos Zamora | H04L 69/08 |
| 2024/0064174 A1* | 2/2024 | Molzon | H04L 63/10 |
| 2024/0070002 A1* | 2/2024 | Muthukrishnan | G06F 9/4887 |
| 2024/0098068 A1* | 3/2024 | Pabijanskas | H04L 12/4633 |
| 2024/0137218 A1* | 4/2024 | Antinori | H04L 9/088 |
| 2024/0144127 A1* | 5/2024 | Dovenor | G06Q 50/40 |
| 2024/0163250 A1* | 5/2024 | Yelamarti | H04L 63/0236 |

\* cited by examiner

| | | Unknown Nodes (x) | | | Removed Nodes (xx) | | |
| | | Search | | | Export | | |
| ALIAS | HOST NAME | MAC ADDRESS | IP ADDRESS | FIRST DETECTED | LAST DETECTED | STATUS | JUSTIFICATION |
| DYNAMIC | SERVER | 3C-F0-11-EB-EE-4D | 192.168.0.106 | Aug/7/2022 9:29:00 PM | Aug/10/2022 9:29:00 PM | Under Investigation | It's under investigation as to why it's connected. |
| DYNAMIC | SERVER | 3C-F0-12-DC-EE-4D | 192.168.7.22 | Aug/7/2022 9:29:00 PM | Aug/10/2022 9:29:00 PM | Under Investigation | It's under investigation as to why it's connected. |
| DYNAMIC | DESKTOP | 24:7E:12:3C:3E:50 | 192.168.7.9 | Aug/7/2022 9:29:00 PM | Aug/10/2022 9:29:00 PM | Pending | Yet to Check |

FIG. 8

APPARATUSES, COMPUTER-IMPLEMENTED METHODS, AND COMPUTER PROGRAM PRODUCTS FOR MANAGING ACCESS OF WIRELESS NODES TO A NETWORK

BACKGROUND

Industrial systems often include network(s) having any number of connected devices. Such devices may be connected wirelessly or via wired connections. These devices may communicate with one another over the network(s) for use in maintaining operational efficiency and accuracy of industrial processes associated with the industrial system. Such network(s) are often flexible, such that new devices may be often attempt to connect to a given network without immediate determination of whether the new device is a trustworthy device or untrustworthy such that connection to the network should not be maintained.

Applicant has discovered problems with current implementations of managing access of wireless nodes to a wireless operational technology network. Through applied effort, ingenuity, and innovation, Applicant has solved many of these identified problems by developing embodied in the present disclosure, which are described in detail below.

BRIEF SUMMARY

In one aspect, a computer-implemented method for managing access of wireless nodes to a wireless operational technology (OT) network includes detecting a node from at least one message communication over a wireless OT network, authenticating node identification information that uniquely identifies the node, confirming that the node is permissioned to access the wireless OT network by at least validating authentication information associated with the node, confirming that the node is attempting an authorized action by at least validating authorization information associated with the at least one message communication, and assigning an access indicator based at least in part on the authenticating of the node identification information, the validating of the authentication information, and the validating of the authorization information.

The computer-implemented method may also include where detecting the node includes continuously monitoring a plurality of message communications over the wireless OT network, and identifying at least the node from the plurality of message communications.

The computer-implemented method may also include where in a circumstance where the access indicator represents an approved status, the computer-implemented method further includes automatically granting access of the node to the wireless OT network for transmission of the at least one message communication.

The computer-implemented method may also include where in a circumstance where the access indicator represents a removed status, the computer-implemented method further includes automatically generating an alert, and automatically transmitting the alert to an administrator device.

The computer-implemented method further includes receiving an indication of a user-granted access of the node, and automatically granting access to the node in response to the user-granted access.

The computer-implemented method further includes causing rendering of a user interface to an administrator device, where the user interface includes an identity of the node and an action requested via the at least one message communication, and receiving the access indicator in response to user engagement with the user interface.

The computer-implemented method may also include where the computer-implemented method is performed by a processor disposed in a L3 layer of the wireless OT network.

The computer-implemented method may also include where the node identification information includes a MAC address and an IP address associated with the node, where the MAC address and the IP address are authenticated via at least one database.

The computer-implemented method further includes detecting, based at least in part on the at least one message communication, that the at least one message communication is associated with a malicious action for an approved node, and removing an approved status in response to the detection of the malicious action.

The computer-implemented method further includes maintaining a database includes a plurality of approved node, and determining that the node identification information associated with the node is not found in the database.

The computer-implemented method further includes tracking each of a node database includes information corresponding to each node associated with the wireless OT network, a metadata database includes information associated with at least one connection of each seen node of the wireless OT network, and a log database includes an administrator log associated with at least one seen node of the wireless OT network.

The computer-implemented method further includes generating a network topology based at least in part on node address information parsed from the at least one message communication.

The computer-implemented method further includes causing rendering of a user interface includes at least one unknown node associated with the wireless OT network.

The computer-implemented method further includes causing rendering of a user interface includes at least one node associated with an investigatory status associated with the wireless OT network Other technical features may be readily apparent to one skilled in the art from the following figures, descriptions, and claims.

In accordance with another aspect of the present disclosure, an apparatus for managing access of wireless nodes to a wireless operational technology network is provided. One example apparatus includes at least one processor and at least one non-transitory memory having computer-coded instructions stored thereon that, in execution with the at least one processor, causes the processor to perform any one of the example computer-implemented methods described herein. In other embodiments, the example apparatus includes means for performing each step of any one of the example computer-implemented methods described herein.

In accordance with another aspect of the present disclosure, a computer program product for managing access of wireless nodes to a wireless operational technology network is provided. One example computer program product includes at least one non-transitory computer-readable storage medium having computer program code stored thereon that, in execution with at least one processor, configures the computer program product for performing any one of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates an example user interface in accordance with at least some example embodiments of the present disclosure.

DETAILED DESCRIPTION

Figure 1:
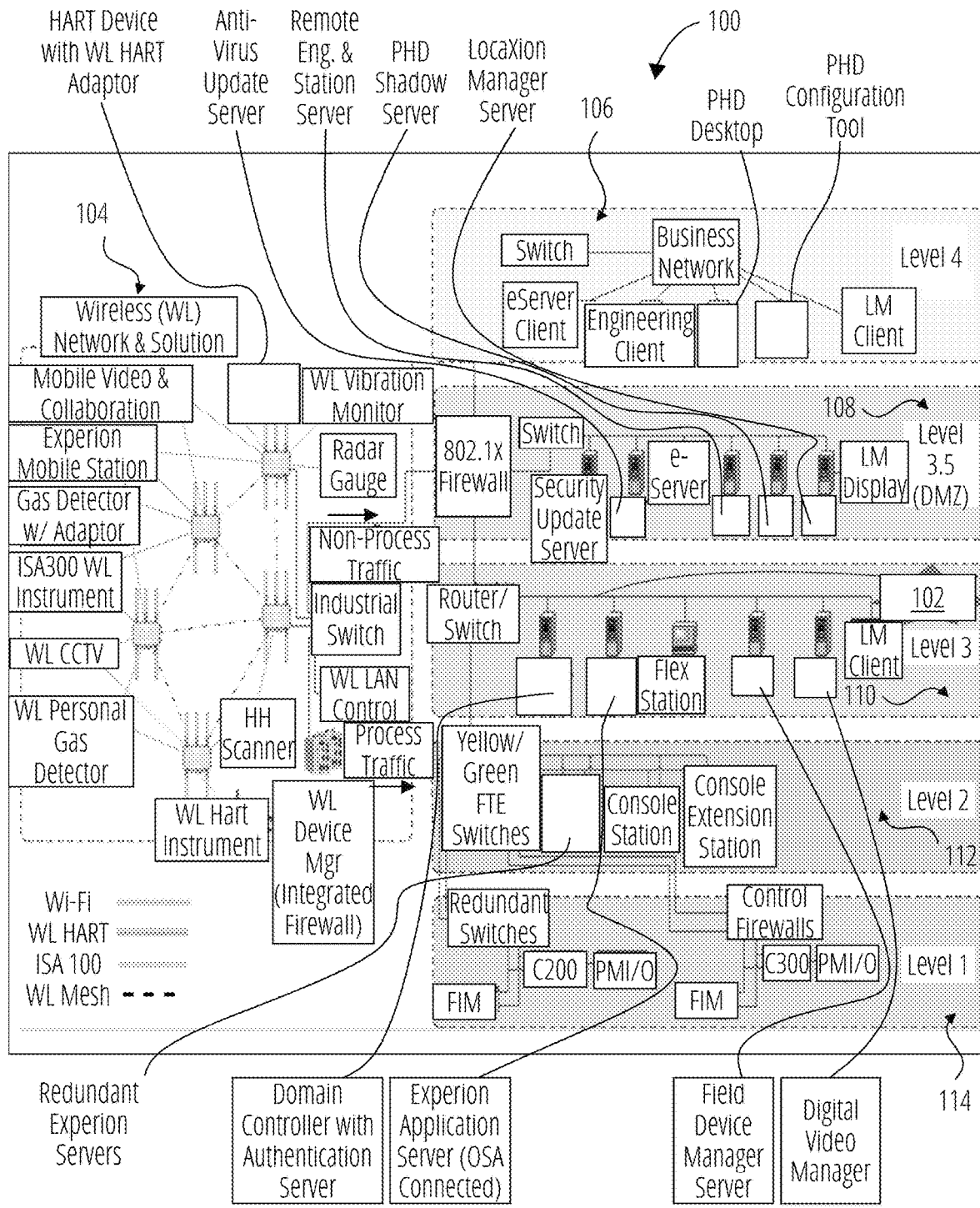
FIG. 1 illustrates a visualization of an example OT/IT network in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Complex industrial and control networks often include a myriad of devices of various types. In many of such contexts, these networks include operational technology devices ("OT devices") that implement or otherwise affect control of at least a portion of an industrial process. Such OT devices may be included with or without additional information technology devices ("IT devices") responsible for collecting, gathering, processing, and/or relaying related data and/or data derived therefrom. The OT devices may form a particular OT network, and may include any number of wired devices connected through wired mechanisms and/or wireless devices that are wirelessly connected to the network. Non-limiting examples of such wired devices include server(s), human-machine interface(s), control station(s), switch(es), router(s), firewall(s), and/or the like, and non-limiting examples of wireless devices include sensor(s), controller(s), field instrument(s), handheld control system (s), mobile phone(s), wireless communication device(s), and/or the like. Such wireless OT devices may include any number and/or types of industrial Internet-of-Things (IIoT) devices that facilitate different functions.

The increasing complexity and dynamic nature of networks having such IIoT and/or generally wireless OT devices relies on efficient, productive, and secure systems that collaborate to ensure industrial processes remain operational and efficient. The collaborative nature of these wireless OT devices is advantageous in that it enables monitoring and control systems that self-organize, are rapidly deployable, highly flexible, and inherently intelligent in their operation. To continue to provide these advantages at scale, such networks often enable addition of more OT devices in the wireless OT network, and require that such added OT devices are communicable with one another and existing devices on the wireless OT network to facilitate a seamless transition of adding a new OT device.

This flexibility in readily enabling addition of new OT devices to the wireless OT network, however, suffers from its own particular technical problems. Each OT device in a network serves as a vulnerability point for prospective cyber-attacks that desire to infiltrate the network, such that the addition of a new wireless OT device provides a new vulnerability point that may be leveraged by malicious actors. As cyber threats continue to increase in prominence within process industries, existing methods for monitoring and mitigating against cyber-attacks to protect critical infrastructure is not sufficient to adequately protect such flexible networks having wireless OT devices from cybersecurity attacks, risks, and/or the like. Wired connected devices and IT devices generally may utilize certain existing tools and methodologies to protect against cyberattacks, however the inventors have determined that these methodologies are unlikely to adequately protect OT devices wirelessly connected to a network from such cyberattacks, and thus fails to adequately keep both the individual OT devices and the network as a whole safe from such cyber-attacks.

One such example context is process control OT networks, where many devices are connected through both wireless and wired connections to a network. Such networks often include many wirelessly connected OT devices that are required for efficient and automatic process operations. With each device that is part of the OT network, including new devices to be added and/or otherwise connected to the OT network, differentiating between whether a device is trusted or untrusted is significant to avoid exposing the OT network to cybersecurity risks. At any given time, however, large OT networks will have many devices connected to the network such that differentiating between trusted or untrusted devices increases in complexity. Without efficient and accurate mechanisms for determining trusted as opposed to untrusted devices, mere identification of devices to an OT network becomes a channel for malicious actors to introduce vulnerabilities and/or cybersecurity risks of cybersecurity attacks on the OT network. In this regard, a malicious actor could utilize the inability for a given system to efficiently and accurately determine whether a particular device, such as a new device connected to the OT network, is trusted as a means to affect system functionality, shutdown a processing plant, introduce malicious software to the system, or introduce a backdoor for collecting data without an administrator's knowledge or system detection.

Such cybersecurity risks posed by untrusted devices manifest in a myriad of contexts. For example, networks often lack of IIoT device visibility, particularly when growing larger in size, and thus are more exposed to cybersecurity risks from untrusted devices. Additionally or alternatively, integration of third-party vendor IIoT devices that access OT network sensitive information, where unknown devices may attempt to access such information and/or data through the reliance on third-party vendor systems and IIoT devices. Additionally or alternatively, inefficiencies of the OT network create a shadow OT network that corresponds to any unauthorized and/or unintended use of devices or other assets in the OT network, for example including employees and/or others working around inefficient operation of the network, where the shadow OT network is more likely to be vulnerable to untrusted devices cybersecurity risks associated therewith. Additionally or alternatively still, worker owned and/or controlled devices may be introduced to the OT network unexpectedly, at inconsistent intervals, and/or the like, which requires careful management of the OT network to prevent such policies from operating as a conductor for untrusted devices affecting an OT network. Any or all of such contexts suffer from particular circumstances that increase the vulnerability of an OT network to cybersecurity risks from introduction of untrusted devices into the network.

Embodiments provide improvements to such circumstances by efficiently and accurately identifying trusted devices for adding to, and/or otherwise effectuating connection to, a particular OT network. Specifically, some embodiments assist in identification of new, known and/or otherwise trusted OT devices added to an OT network, and update the OT network using detection via message communication(s) and related network management protocols. Some embodiments additionally perform network topology mapping based at least in part on message communications and/or switch IP port monitoring.

Some embodiments detect new and/or unknown nodes on an OT network. Once detected, information associated with the node is storable to at least one database, and/or a particular node status is assigned. Such databases may include a node database that stores information associated nodes and/or assets trusted for an OT network, a metadata database that stores metadata associated with each node and/or asset, and/or a log database that stores historical logs associated with each asset and changes that were performed associated with the OT network and/or particular connected nodes thereof. Subsequently, some embodiments enable processing of information associated with such nodes to determine whether a node is approved as trusted, removed as untrusted, and/or the like. Such monitoring may be performed in real-time as message communications are transmitted, such that real-time updates to the statuses of such nodes may be updated as new actions are identified.

In some embodiments, a node is detected based at least in part on a MAC address, IP address, or other node address information identified for a particular node. In a circumstance where a detected node is identified as not previously approved, known, and/or trusted, embodiments may generate and/or otherwise cause rendering of an alert identifying the node.

In some such embodiments, detection of a newly discovered unknown node on or connecting to an OT network initiates immediate identification, classification, and further processing of the newly discovered node to determine whether the node is trusted. In some embodiments, an unknown node is processed based at least in part on a device type associated with the node and/or a connection type associated with the node. Some embodiments process such data to determine whether any modification to existing trusted nodes has occurred in response to addition of the unknown device, such that an alert to an administrator device is renderable and/or otherwise transmittable in response to such a determination. Based on the classification, necessary protections against cybersecurity risks may be taken to protect the network and the unknown node as an asset from such cybersecurity risks, including actions that are performed proactively and/or otherwise respond to an occurring incident.

Embodiments may perform end user actions for converting an unknown node into a trusted node representing an asset of an OT network, marking a node as under investigation as an unknown node, removing a node as untrusted, viewing all active but unknown nodes, viewing all removed unknown and/or previously known nodes, and/or bulk affecting multiple unknown nodes. Additionally or alternatively, some embodiments perform asset management actions for adjusting an asset database to a multi-database structure, for example creating a metadata database and a separate asset database, function to adding node information to such databases, functioning in real-time as an OT network operates, optional deletion and/or archiving of asset data, operational logs, and/or metadata associated with a node when the node is removed as a trusted asset from the OT network, and/or storing of node metadata representing all source switches from a first trap to a last trap, as described herein. Additionally or alternatively, some embodiments perform logging by storing operational log(s) for each update and/or action performed associated with an untrusted node, and/or end users such as administrators may view and/or process details associated with an unknown node (e.g., operational logs and/or status data associated with the node). Additionally or alternatively, some embodiments perform continuous real-time detection, such that an untrusted node associated with a removed status may be detected again and return to an unknown status with historical data associated with the untrusted node available, for example such that historical alert(s) regarding the node may again be provided and/or analyzed. Some such detection may occur for unknown, under investigation, and/or removed nodes that are detected on different switches and/or other components of an OT network from which they were previously detected. Additionally or alternatively still, some embodiments perform enabling of a learning mode, such that such embodiments may be configured to auto-accept nodes as trusted assets of the OT network and rapidly add newly detected unknown nodes as trusted nodes of the OT network. Collected data associated with all nodes may be provided via one or more user interfaces, for example to an administrator device, when such a learning mode is enabled, whereas only collected data associated with trusted nodes is provided via one or more user interfaces, for example to the administrator device.

Some embodiments are implemented as a computer-implemented process, apparatus, system, computer program product, and/or the like. Some such embodiments are implemented as via a particular device embodied in hardware, software, firmware, and/or any combination thereof, on an L3 layer of the network, which enables communication and/or identification of message communication(s) of OT devices wired and/or wirelessly connected to the network. In this regard, embodiments of the present disclosure provide for access management for both wirelessly connected OT devices as well as wire connected OT devices. The network may have any other number of network layers associated with different devices, types of devices, and/or the like that facilitate different functions associated with operation of the network.

In some embodiments, data from wirelessly connected OT devices connected to an OT network is collected from message communications transmitted via the OT network. Such data may include a node type, a node model, a node vendor, node address information, node configuration data, and/or the like. The collected data is processable via a data processor, for example that normalizes the data to a standardized structured format for further processing. The data processor in some embodiments classifies the node as wirelessly connected or wire connected based at least in part on the data collected associated with the device. In some embodiments, once data processing is complete, data representing a node list associated with nodes on an OT network is/are processed for data comparison. The data comparison may compare the node list with a baseline list associated with the OT network. In some embodiments, the baseline list includes data in a standardized format representing data of previously approved nodes on the OT network. If the comparison indicates changes, for example new devices connected and/or changes to existing devices and/or topology of the OT network, data indicating the detected difference in comparison is generated. In some embodiments, an alert is generated in response to a detected difference, for example where embodiments cause rendering of the alert to an administrator device.

In some embodiments, the data indicating results of the comparison is included in the alert provided to an administrator, for example regarding detection of a new device as a node and/or any changes to existing devices representing nodes on the OT network. In some embodiments, an administrator reviews the alert via an administrator device and approves or removes the node. One or more databases may be updated accordingly based on the response from the administrator. For example, an approved status assigned to a previously unknown node may be utilized to add the device as a trusted asset of the OT network, and a removed status may be utilized to discontinue the device's access to the OT network. Data collected associated with unknown devices may subsequently be utilized to present one or more alert(s) and/or other user interface(s), for example user interfaces indicating unknown nodes and/or associated data, removed nodes and/or associated data, and/or the like. In this regard, embodiments of the present disclosure may monitor device status, such that devices may be transitioned from an unknown status to an investigatory status, approved status, and/or removed status rapidly and effectively based on collected and derived data associated with such devices.

In some embodiments, deep learning SNMP traps and parses message communication according to a particular trap parser. For example, a SNMP trap MAC notification may be parsed into the received IP address and MAC address for processing and/or storing. Additionally or alternatively, embodiments may include creation of parsers specially configured for parsing each specific type of notification and/or captured message communication. Additionally or alternatively, some embodiments translate MAC trap notifications, and/or related message communication(s) into an IP address that can be scanned for investigation. In some embodiments, a reverse ARP protocol that identifies an IP address using a link layer address, such as a MAC address. Additionally or alternatively, some embodiments use MAC caching to maintain uniqueness between the incoming collected MAC trap messages. Additionally or alternatively, in some embodiments a SNMP MAC notification trap structure is created embodying a data object including information of a MAC change notification event when detected, for example that consists of a plurality of tuples packaged together for processing.

In some embodiments detect switch and IP port data for each node communicating via one or more message communications. Some embodiments utilize an algorithm that collects CDP and/or LLDP data as message communication(s) is/are transmitted. Based at least in part on such data, one or more MAC address table(s) is/are generated. The algorithm further detects a customer entering a trunk port, raises an alert, transmits data to the full MAC address table, including the trunk port, and saves or otherwise stores the whole MAC address table (e.g., to a file or a database, or the like). Additionally or alternatively, some embodiments find untrusted nodes from the collected data, for example by collecting MAC address profiles, creating a dictionary with switch names and MAC address ports, and if the MAC address does not exist in previously listed MAC addresses for the switch creates a new untrusted node profile and/or record, and attempts to get the MAC port. In some embodiments, a node database embodying an asset database creates MAC address tables in this manner for all switches, and attempts to find a specific port accordingly.

It will be appreciated that based at least in part on the MAC address tables, nodes connected to each switch may be determined. Additionally, the MAC address ports for each switch is determinable to create a network topology of connected devices and/or other switches. Based on such node connections, a topology map may be created for all nodes in the OT network accordingly. The network topology may be stored for further processing, displayed via one or more user interfaces, and/or otherwise utilized for automatic and/or manually implemented processes.

Some embodiments detect a node from at least one message communication over a wireless OT network. Some embodiments detect the node from data parsed and/or otherwise extracted from the at least one message communication during monitoring of the wireless OT network. For example, some embodiments identify a device identifier or other node identification information from the at least one message communication.

Further, some embodiments authenticate node identification information that uniquely identifies a node. For example, some embodiments validate that node identification information from the at least one message communication is not associated with two nodes simultaneously, for example having different device identifiers.

Further, some embodiments confirm that the node is permissioned to access the wireless OT network. Some embodiments perform such confirmation by at least validating authentication information associated with the node. In some embodiments, the authentication information is retrieved from the at least one message communication. In some embodiments, the authentication information is compared with a baseline list of data indicating authenticated nodes on or otherwise approved for connecting to the wireless OT network.

Further, some embodiments confirm that the node is attempting an authorized action. Some embodiments perform such confirmation by at least validating authorization information associated with the at least one message communication. In some embodiments, the authorization information is parsed and/or otherwise extracted from the at least one message communication. In this regard, the authorization information in some embodiments represents an action that the node is attempting to perform via at least in part on the at least one message communication. In this regard, such embodiments may confirm that a previously trusted node is not attempting to perform an action that is not authorized for such a node.

Further, some embodiments assigns an access indicator associated with the node. In some embodiments, the access indicator represents a particular access status associated with communicating via the wireless OT network. In some embodiments, the access indicator is set to represent one of an investigatory status, an approved status, or a removed status. In some embodiments, the access indicator is based at least in part on the authenticating of the node identification information, the validating of the authentication information, and the validating of the authorization information. For example, an access indicator may be assigned an approved status in a circumstance where all such confirmations and/or validations are satisfied. Alternatively or additionally, a removed status may be circumstance automatically if one or more of the confirmations and/or validations is not satisfied. Alternatively or additionally, in some embodiments, an investigatory status is assigned automatically if one or more of the confirmations and/or validations is not satisfied. In some embodiments an alert is generated and/or rendered to an administrator device in a circumstance where an investigatory status and/or removed status is assigned. An administrator may access one or more user interfaces, for example via an administrator device, to review, further investigate, and approve and/or remove nodes based at least in part on the data associated with the one or more nodes rendered via the user interface(s).

Definitions

"Access" refers to a state of authorized transmission of data over a particular communications network by a particular device.

"Access indicator" refers to electronically managed data representing a state of access to a particular communications network. Non-limiting examples of an access indicator include an approved status granting access to a communications network, a removed status denying access to a communications network, and an investigatory status indicating a pending review of access to the communications network.

"Action" refers to a computer-executed process performed via transmission of at least one particular message communication over a communications network.

"Administrator device" refers to a device configured to enable changes to access of a communications network for one or more node(s).

"Administrator log" refers to a record of electronically managed data representing changes to configuration and/or access of at least one node with respect to a particular communications network.

"Alert" refers to electronically managed data transmissible to a device that indicates existence of an unknown node detected as part of or connecting to a communications network, a potentially malicious node detected as part of or connecting to a communications network, and/or a determined malicious node detected as part of or connecting to a communications network, where the alert includes data for review by an administrator associated with the device.

"Approved node" refers to a node previously granted access to a particular communications network for performing one or more action(s). An approved node is associated with at least one approved status.

"Approved status" refers to electronically managed data associated with a particular node indicating that the node is granted access to utilize a communications network for at least one particular authorized action.

"Authentication credential data" refers to electronically managed data utilized to identify a particular node and/or user of a node on a communications network.

"Authentication information" refers to electronically managed data extracted from, parsed from, or otherwise identified associated with at least one message communication that is utilized to determine whether a node associated with the at least one message communication corresponds to a particular identity. In some embodiments authentication information includes asserted authentication credential data associated with a node.

"Authorization information" refers to electronically managed data extracted from, parsed from, or otherwise identified associated with at least one message communication that is utilized to determine whether a node associated with at least one message communication is permissioned to perform a particular action associated with the at least one message communication.

"Authorized action" refers to a particular action permissioned for execution by a particular node via a particular communications node via transmission of one or more message communication(s).

"Communications network" refers to hardware, software, firmware, and/or a combination thereof, that facilitates transmission of a message communication between a plurality of interconnected nodes via wired and/or wireless transmission protocol(s).

"Connection" refers to a state of transmission between two or more nodes that enable transmission of at least one message communication directly between the two or more nodes.

"Device" refers to hardware, software, firmware, and/or a combination thereof, that enables processing of data and connection to a communications network directly or indirectly through another device.

"Investigatory status" refers to electronically managed data associated with a particular node indicating that the node is awaiting review to determine whether the node will be granted access to a particular communications network for at least one authorized action.

"Log database" refers to at least one repository embodied in hardware, software, firmware, and/or a combination thereof, that is configured to store one or more administrator log(s).

"Malicious action" refers to an unpermissioned action attempted by a node over a communications network via transmission of one or more particular message communication(s).

"Message communication" refers to electronically managed data transmitted associated with an event detected for a particular network and/or for propagation via the communications network. Non-limiting examples of a message communication include an incident event message, a SNMP trap event message, and a data request transmitted from a node on the network.

"Metadata database" refers to at least one repository embodied in hardware, software, firmware, and/or a combination thereof, that is configured to store metadata associated with at least one node of a communications network.

"Network topology" refers to electronically managed data representing existence of unconnected and/or connected nodes of a communications network and each connection of such node(s) and other node(s) of the communications network and/or external communication network(s).

"Node" refers to any hardware, software, firmware, and/or a combination thereof, that is configured to transmit and/or receive message communication(s) via a communications network.

"Node address information" refers to electronically managed data that uniquely identifies a location associated with a node communicable via a communications network.

"Node connection data" with respect to a particular node refers to electronically-managed data that identifies the location(s) of one or more node(s) communicable via connection(s) maintained by the particular node. Non-limiting examples of node connection data includes MAC address data for an edge node, and switch port data for an edge node.

"Node database" refers to refers to at least one repository embodied in hardware, software, firmware, and/or a combination thereof, that is configured to store data representing an identity of a particular node connected to and/or otherwise associated with a communications network (e.g., disconnected from but previously connected to, awaiting access review, and/or otherwise detected associated with the communications network).

"Node identification information" refers to electronically managed data that uniquely identifies a node on a communications network. Non-limiting examples of node identification information includes an IP address, a MAC address, and a custom unique identifier.

"Operational technology device" and "OT device" refer to a particular device configured to monitor and/or control a physical process, machine, infrastructure, and/or other equipment.

"Removed status" refers to electronically managed data associated with a particular node indicating that the node is denied access to utilize a communications network for at least one action.

"Seen node" refers to a node that has previously been connected to or attempted to connect to a communications network. A seen node may be currently connected to the communications network or currently unconnected to the communications network.

"Unconnected node" refers to a node currently not communicable via a communications network.

"Unknown node" refers to a node that is not currently associated with an access indicator.

"User engagement" refers to any touch, gesture, peripheral input, or other input or action performed with respect to a user interface by a user that causes particular event to be detected by a device.

"User interface" refers to electronically managed data that is visually depictable via a display of, or associated with, a device for outputting to a user of the device.

"User-granted access" refers to a state of granted access to use of a communications network for a particular node, wherein the granted access is established in response user engagement.

"Wireless OT network" refers to a communications network include at least one operational technology device that is configured to communicate via the communications network utilizing at least one wireless transmission protocol.

Example Systems and Apparatuses of the Disclosure

FIG. 1 illustrates a visualization of an example OT/IT network in accordance with at least some example embodiments of the present disclosure. Specifically, FIG. 1 illustrates an example network embodying a wireless OT network 100. In some embodiments, the wireless OT network 100 includes a plurality of nodes, each facilitating communication to and/or between the various devices connected to the wireless OT network 100. In this regard, each device connected to the wireless OT network 100 may be considered a node operating with respect to the wireless OT network 100. Additionally or alternatively, in some embodiments, the wireless OT network 100 includes or is associated with operation of component(s) of an industrial plant, for example that is controlled to perform a particular industrial process manually, semi-autonomously, and/or fully autonomously.

As illustrated, the wireless OT network 100 includes a plurality of edge OT nodes 104. In some embodiments, the edge OT nodes 104 includes one or more OT device(s) connected to the network. In some embodiments, the OT device(s) control and/or monitor one or more operation(s) of an industrial plant/system. Additionally or alternatively, in some embodiments, the OT device(s) of the edge OT nodes 104 enable interfacing and/or interaction with a monitor and/or controlled environment, which may be performed automatically and/or in response to user input via the device(s), embodying such edge OT nodes 104. For example, in some embodiments, the edge OT nodes 104 includes one or more video and/or collaboration device(s), wireless vibration monitor(s), radar gauge(s), handheld device(s), user device(s), sensor(s), HART device(s), Experion mobile station(s), and/or the like. Additionally or alternatively, in some embodiments, the edge OT nodes 104 includes wireless and/or wired networking solution node(s), for example wireless LAN controller(s), traffic processing device(s), and/or industrial switch(es) that route traffic between particular nodes for transmission and/or further processing. In some embodiments, one or more of the edge OT nodes 104 is wirelessly connected to the wireless OT network 100, such that message communication(s) transmitted to and/or from a particular node is performed via a wireless communication protocol (e.g., Wi-Fi, Zigbee, Bluetooth, and/or the like). Additionally or alternatively, in some embodiments, the edge OT nodes 104 includes one or more node(s) having a wired connection to the wireless OT network 100 (e.g., over ethernet, and/or the like). In this regard, the wireless OT network 100 including at least one wirelessly connected device (e.g., a wirelessly connected OT device) may embody a wireless OT network that facilitates wireless communication(s) with the wirelessly connected device. It will be appreciated that each of the edge OT nodes 104 embodies a particular individual node "on," or otherwise connected to, the network represented by wireless OT network 100.

The wireless OT network 100 further includes a plurality of nodes arranged into particular layers. In some embodiments, for example, the wireless OT network 100 is arranged in layers based at least in part on the OSI model of network architecture(s). For example, as illustrated, the wireless OT network 100 includes a plurality of nodes arranged into particular networking layers, for example L1 nodes 114, L2 nodes 112, L3 nodes 110, L3.5 nodes 108, and L4 nodes 106. In some embodiments, the layers are arranged in a manner that includes particular devices having particular functionality in accordance with the OSI model. For example, in some embodiments, the L1 nodes 114 includes controller(s) and/or physical monitoring devices that perform data collection and/or generation and/or associated switch(es) and/or firewall(s), L2 nodes 112 includes console station(s) and/or redundant server(s) (e.g., Experion servers) and/or associated switch(es) that perform addressing and/or media access, L3 nodes 110 includes at least one router and/or switch, domain controller with authentication server, application server(s) (e.g., Experion application server(s) and/or the like), field device management server(s), digital video management server(s), client(s), and/or the like that perform logical addressing and pathing of message communication(s) over the wireless OT network 100, L3.5 nodes 108 that include a primary firewall (e.g., an 802.1x supporting firewall), security management server(s), antivirus management server(s), eServer(s), remote station and engineering server(s), shadow server(s), proxy server(s), and/or the like that embody a DMZ connection with an external and/or public network (e.g., the Internet), and L4 nodes 106 including a switch and business network, engineering client, eServer client, and/or the like that provide access to the functionality and/or data of lower-layer devices from external from a secured portion of the wireless OT network 100. It will be appreciated that in other embodiments the network layers may be arranged in accordance with other categorizations of functionality.

In some embodiments, the wireless OT network 100 includes an OT network management system 102 deployed within the network. In some embodiments, the OT network management system 102 includes hardware, software, firmware, and/or any combination thereof, that performs functionality for managing access of nodes, including wireless nodes, to an OT network, including a wireless OT network such as wireless OT network 100, as described herein. For example, in some embodiments, the OT network management system 102 includes one or more personal computer(s), application server(s), database server(s), enterprise terminal(s), and/or the like that is/are specially configured via one or more software application(s) to perform the functionality described herein. In some embodiments, the OT network management system 102 detects and/or otherwise identifies message communication(s) transmitted by and/or between node(s) of the wireless OT network 100 for processing. Additionally or alternatively, in some embodiments, the OT network management system 102 processes data, for example identified message communication(s), stored data associated with the nodes of the wireless OT network 100, and/or the like, to detect assign an access indicator with a particular node, and/or grant access to the wireless OT network 100 based at least in part on the access indicator. Additionally or alternatively, in some embodiments, the OT network management system 102 processes data to generate and/or maintain a network topology corresponding to the OT network management system 102. Additionally or alternatively still, in some embodiments, the OT network management system 102 generates and/or causes rendering of one or more alert(s), user interface(s), and/or the like, for use in monitoring access to the wireless OT network 100 and/or managing such access to the wireless OT network 100 for one or more node(s).

In some embodiments, the OT network management system 102 is disposed within a particular layer of the wireless OT network 100. For example, as illustrated, the OT network management system 102 is disposed within the L3 layer of the wireless OT network 100, as one of the L3 nodes 110. In some embodiments, the OT network management system 102 is disposed in the L3 layer to enable capturing of wireless and wired message communication(s) transmitted via the wireless OT network 100. In this regard, the OT network management system 102 may enable data-driven determinations associated with wirelessly connected devices, such as wireless connected OT devices, and/or other node(s) of the wireless OT network 100 that are connected utilizing a wire for communication via the wireless OT network 100.

Figure 2:
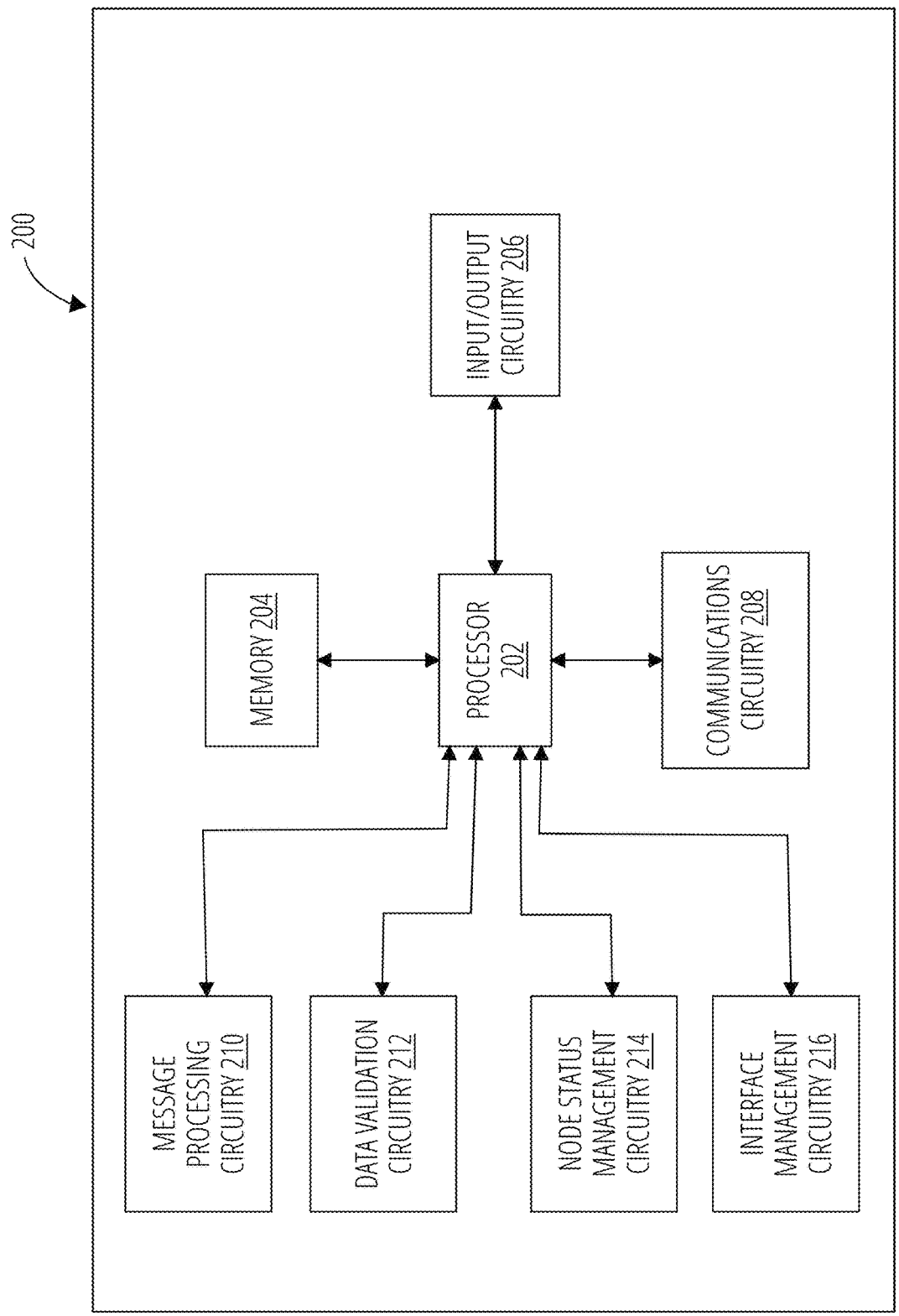
FIG. 2 illustrates a block diagram of an example apparatus that may be specially configured in accordance with at least some example embodiments of the present disclosure.

FIG. 2 illustrates a block diagram of an example apparatus that may be specially configured in accordance with at least some example embodiments of the present disclosure. Specifically, FIG. 2 illustrates an example OT network management apparatus 200 ("apparatus 200") specifically configured in accordance with at least one example embodiment of the present disclosure. In some embodiments, the OT network management system 102, and/or a portion thereof, is embodied by one or more system(s), device(s), and/or the like, such as the apparatus 200 as depicted and described in FIG. 2. The apparatus 200 includes processor 202, memory 204, input/output circuitry 206, communications circuitry 208, message processing circuitry 210, data validation circuitry 212, node status management circuitry 214, and/or interface management circuitry 216. In some embodiments, the apparatus 200 is configured, using one or more of the sets of circuitry 202, 204, 206, 208, 210, 212, 214, and/or 216, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components of the apparatus 200 are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed. In some embodiments, the processor 202 includes or is embodied by a CPU, microprocessor, and/or the like that executes computer-coded instructions, for example stored via the non-transitory memory 204.

In some example embodiments, the processor 202 is configured to perform various operations associated with managing access of nodes to an OT network, including wireless nodes accessing a wireless OT network. In this regard, in some embodiments the processor 202 enables manual and/or automated management of access of particular devices to a network, and monitoring to initiate changes to such access as the network operates. In some embodiments, the processor 202 includes hardware, software, firmware, and/or a combination thereof, that detects and/or otherwise identifies message communication(s) transmitted via a network. Additionally or alternatively, in some embodiments, the processor 202 includes hardware, software, firmware, and/or a combination thereof, that parses and/or extracts data from message communication(s) identified from the network. Additionally or alternatively, in some embodiments, the processor 202 includes hardware, software, firmware, and/or a combination thereof, that stores data parsed and/or extracted from message communication(s). Additionally or alternatively, in some embodiments, the processor 202 includes hardware, software, firmware, and/or a combination thereof, that stores data to one or more databases based at least in part on the message communication(s), for example including data parsed from the message communication(s) and/or data derived based at least in part on data parsed from the message communication(s).

Additionally or alternatively, in some embodiments, the processor 202 includes hardware, software, firmware, and/or a combination thereof, that detects a node from the at least one message communication over the network, such as a wireless OT network. Additionally or alternatively, in some embodiments, the processor 202 includes hardware, software, firmware, and/or a combination thereof, that performs one or more validations of data parsed from or otherwise identified associated with the message communication(s), for example and without limitation an authentication of node identification information that uniquely identifies the node, confirmation that the node is permissioned to access the wireless OT network based at least in part on validation of authentication information associated with the node, and/or confirmation that the node is attempting an authorized action based at least in part on validation of authorization information associated with the at least one message communications network. Additionally or alternatively, in some embodiments, the processor 202 includes hardware, software, firmware, and/or a combination thereof, that assigns an access indicator based at least in part on the results of one or more of the validation(s). Additionally or alternatively, in some embodiments, the processor 202 includes hardware, software, firmware, and/or a combination thereof, that causes rendering of one or more alert(s) and/or other user interface(s) to an external device or display, for example an administrator device.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes hardware, software, firmware, and/or a combination thereof, that facilitates simultaneously display of particular data via a plurality of different devices.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the apparatus 200.

In some embodiments, the apparatus 200 includes message processing circuitry 210. The message processing circuitry 210 supports functionality associated with processing data of message communication(s) transmitted via a network. For example, in some embodiments, the message processing circuitry 210 includes hardware, software, firmware, and/or a combination thereof, that detects message communication(s) transmitted over a particular network. Additionally or alternatively, in some embodiments, the message processing circuitry 210 includes hardware, software, firmware, and/or a combination thereof, that parses data from one or more detected message communication(s). Additionally or alternatively, in some embodiments, the message processing circuitry 210 includes hardware, software, firmware, and/or a combination thereof, that performs SNMP trapping. Additionally or alternatively, in some embodiments, the message processing circuitry 210 includes hardware, software, firmware, and/or a combination thereof, that retrieves stored data based at least in part on the message communication(s). For example, in some embodiments, the message processing circuitry 210 supports determination of node identification information, authentication information, and authorized action associated with a particular message communication. For example in some embodiments the message processing circuitry 210 identifies MAC address information, and/or other node address information, for a particular node corresponding to one or more message communication(s). Additionally or alternatively, in some embodiments, the message processing circuitry 210 includes hardware, software, firmware, and/or a combination thereof, that queries one or more database(s) for stored information associated with a particular node, for example based at least in part on a device identifier or other node identification information associated with a particular message communication. Additionally or alternatively, in some embodiments, the message processing circuitry 210 includes hardware, software, firmware, and/or a combination thereof, that stores data associated with a message communication (or node corresponding to the message communication) to at least one database, for example node address information, node metadata, and/or the like. In some embodiments, the message processing circuitry 210 includes a separate processor, specially configured field programmable gate array (FPGA), or a specially programmed application specific integrated circuit (ASIC).

In some embodiments, the apparatus 200 includes data validation circuitry 212. The data validation circuitry 212 supports functionality associated with performing one or more data validations associated with a particular node and/or message communication. For example, in some embodiments, the data validation circuitry 212 includes hardware, software, firmware, and/or a combination thereof, that retrieves and/or otherwise identifies stored, historical, and/or other baseline data for comparison to data associated with a particular message communication and/or node. Additionally or alternatively, in some embodiments, the data validation circuitry 212 includes hardware, software, firmware, and/or a combination thereof, that authenticates identification information for a particular node. Additionally or alternatively, in some embodiments, the data validation circuitry 212 includes hardware, software, firmware, and/or a combination thereof, that validates authorization information associated with at least one message communication. Additionally or alternatively, in some embodiments, the data validation circuitry 212 includes hardware, software, firmware, and/or a combination thereof, that validates authorization information associated with at least one message communication. In some embodiments, the data validation circuitry 212 includes a separate processor, specially configured field programmable gate array (FPGA), or a specially programmed application specific integrated circuit (ASIC).

In some embodiments, the apparatus 200 includes node status management circuitry 214. The node status management circuitry 214 supports functionality associated with assigning an access indicator of a particular value to a node for granting, to particular nodes, access to a network. For example, in some embodiments, the node status management circuitry 214 includes hardware, software, firmware, and/or a combination thereof, that determines an access indicator to be assigned to a particular node. In some embodiments, the access indicator is determined based at least in part on the results of one or more validation(s) performed by the apparatus 200. Additionally or alternatively, in some embodiments, the node status management circuitry 214 includes hardware, software, firmware, and/or a combination thereof, that stores one or more data record(s)

in a database indicating an access indicator associated with a particular node. Additionally or alternatively, in some embodiments, the node status management circuitry 214 includes hardware, software, firmware, and/or a combination thereof, that grants or denies access to a node associated with a network based at least in part on a determined access indicator corresponding to the node. For example, in some embodiments, the node status management circuitry 214 permits continued propagation or terminates continued propagation of a message communication based at least in part on an access indicator. In some embodiments, the node status management circuitry 214 includes a separate processor, specially configured field programmable gate array (FPGA), or a specially programmed application specific integrated circuit (ASIC).

In some embodiments, the apparatus 200 includes interface management circuitry 216. The interface management circuitry 216 supports functionality associated with generating and/or otherwise configuring data utilized to render particular visual interface(s) to one or more device(s). For example, in some embodiments, the interface management circuitry 216 includes hardware, software, firmware, and/or any combination thereof, that generates an alert associated with a particular node. Additionally or alternatively, in some embodiments, the interface management circuitry 216 includes hardware, software, firmware, and/or any combination thereof, that transmits data representing or including the alert for causing rendering of the alert to an administrator device, display, or other external device. Additionally or alternatively, in some embodiments, the interface management circuitry 216 includes hardware, software, firmware, and/or any combination thereof, that causes rendering of a user interface associated with viewing and/or managing a current value for an access indicator associated with one or more node(s) of a network. Additionally or alternatively, in some embodiments, the interface management circuitry 216 includes hardware, software, firmware, and/or any combination thereof, that transmits data representing or including the user interface for causing rendering of the user interface to an administrator device, display, and/or other external device. In some embodiments, the interface management circuitry 216 includes a separate processor, specially configured field programmable gate array (FPGA), or a specially programmed application specific integrated circuit (ASIC).

Additionally or alternatively, in some embodiments, two or more of the sets of circuitries 202-216 are combinable. Alternatively or additionally, in some embodiments, one or more of the sets of circuitry perform some or all of the functionality described associated with another component. For example, in some embodiments, two or more of the sets of circuitry 202-216 are combined into a single module embodied in hardware, software, firmware, and/or a combination thereof. Similarly, in some embodiments, one or more of the sets of circuitry, for example the message processing circuitry 210, the data validation circuitry 212, the node status management circuitry 214, and/or the interface management circuitry 216, is/are combined with the processor 202, such that the processor 202 performs one or more of the operations described above with respect to each of these sets of circuitry 210-216.

Example Data Architectures and Processing Flows of the Disclosure

Figure 3:
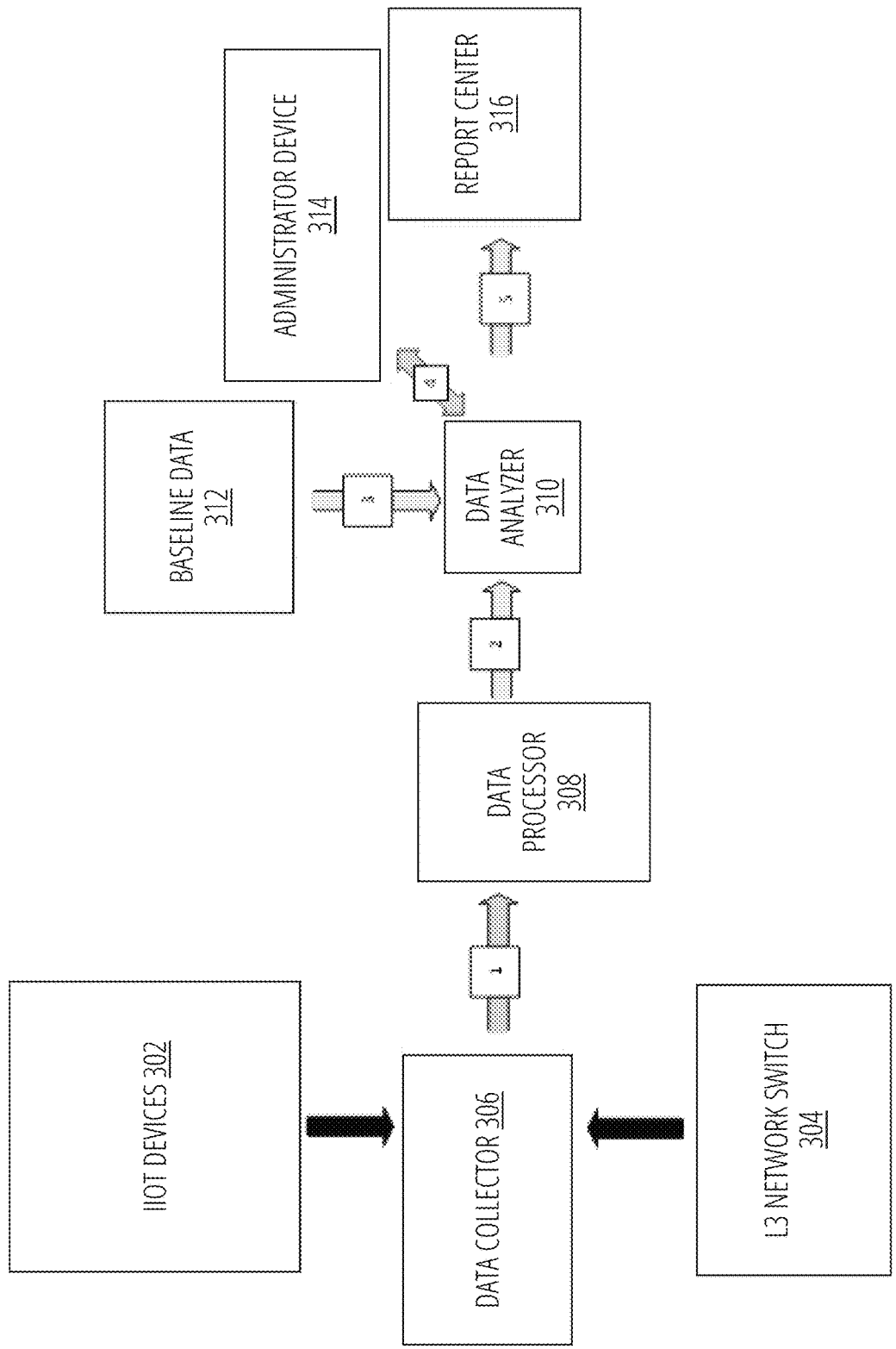
FIG. 3 illustrates an example visualization of operations performed for managing access of wireless nodes to a wireless OT network in accordance with at least some example embodiments of the present disclosure.

FIG. 3 illustrates an example visualization of operations performed for managing access of wireless nodes to a wireless OT network in accordance with at least some example embodiments of the present disclosure. It will be appreciated that, in some embodiments, the operations similarly extend to managing access of wired nodes in an OT network. In some embodiments, the operations embody a data flow between particular device(s), and/or components or sub-systems of a device, for managing access of a node to a particular network. For example, in some embodiments, the data flow occurs between IIOT devices 302, L3 network switch 304, and administrator device 314, each in communication with apparatus 200 and disposed within a particular network (e.g., a wireless OT network). As illustrated, the data collector 306, data processor 308, data analyzer 310, and administrator device 314 are embodied in whole or in part by sub-systems of the apparatus 200, for example embodied in hardware, software, firmware, and/or any combination thereof.

As illustrated, the IIOT devices 302 and the L3 network switch 304 interact with the data collector 306. In some embodiments, the IIOT devices 302 includes one or more OT devices that is/are wirelessly connected to a wireless OT network. In some embodiments, the data collector 306 generates and/or extracts data log(s) based at least in part on the operation of the IIOT devices 302 with the network. For example, in some embodiments, the data collector 306 generates and/or otherwise collects data log(s) based at least in part on data identifying a device, and/or a configuration of a device, of the IIOT devices 302. In some embodiments, the data collector 306 generates and/or otherwise collects any data available regarding the IIOT devices 302 connected to the network. Such data may include, for each and/or any of such devices, data portion(s) representing device type, a device model, a device vendor, a device address, a device configuration, and/or the like. Additionally or alternatively, in some embodiments, the data collector 306 collects and/or identifies such data based at least in part on captured message communication(s) transmitted over the particular network, for example where the network includes L3 network switch 304 that captures the message communications as they are transmitted across the network. In some such embodiments, the message communication(s) may be captured and/or processed upon reaching the L3 network switch 304, for example to enable detection and subsequent processing of message communication(s) transmitted over wireless means and/or wired means. In some embodiments, the apparatus 200 is deployed as a sub-system of the L3 network switch 304.

In some embodiments, the data collector 306 (e.g., embodied as a subsystem of the apparatus 200), provides the generated and/or collected data log(s) to the data processor 308. In some embodiments, the data log(s) captured by the data collector 306 embody captured data in an unstandardized and/or unnormalized format that makes comparison, processing, and/or storing of the logs impractical and/or impossible. In some embodiments, the data processor 308 may normalize the data logs into structured log(s) of a standardized format to enable such comparison, processing, and/or storing of the structured log(s). Additionally or alternatively, in some embodiments, the data processor 308 classifies the type of structured log for comparison and/or monitoring with respect to the network, as described herein. For example, in some embodiments, the data collector 306 in some embodiments classifies data log(s) as associated with a wired or wireless configuration, for example based at least in part on a node address information and/or a device type corresponding to the node originating one or more of the message communication(s) with which the data log is associated. In some embodiments, the data processor 308 performs such processing for a plurality of message communications and corresponding nodes, such that the data processor 308 may utilize the processed data to formulate a list of nodes connected to the network (e.g., including wirelessly connected and/or wired nodes).

In some embodiments, the data processor 308 provides structured log(s) and/or list of connected devices to the data analyzer 310. In some embodiments, the data analyzer 310 performs a comparison of the data represented in the structured log(s) and/or list of connected devices with corresponding baseline data, for example represented by the baseline data 312. The baseline data 312 embodies or includes data identifying a list of previously connected and/or approved nodes in the network, and/or configurations of such previously approved nodes. In some embodiments, the baseline data 312 is embodied in the same standardized or otherwise normalized format as the structured log(s) collected and/or generated by the data collector 306 and data processor 308. In some embodiments, the baseline data 312 is retrieved from a defined database accessible to the apparatus 200.

In some embodiments, the data analyzer 310 in some embodiments performs a comparison between the data received from the data processor 308 (e.g., the list of nodes and/or structured log(s) associated with such nodes) and the baseline data 312. In some embodiments, the data analyzer 310 compares such data to detect any particular anomalies, deviations, changes, or other unexpected behavior between the baseline data 312 and current data extracted from operation of the IIOT devices 302. For example, in some embodiments, the data analyzer 310 performs a comparison between such data to determine if there are any newly connected nodes in the list of nodes, and/or any changes to the existing node structure of the network, and/or any changes in configuration to any of the existing nodes on the network. In this regard, in some embodiments the data analyzer 310 flags each change, deviation, anomaly, and/or the like detected via the performed comparison. It will be appreciated that the data analyzer 310 may include or embody a rule set, specially configured model, and/or the like, utilized for processing the data received from the data processor 308 alone and/or in conjunction with the baseline data 312 to detect anomalies, changes, and/or the like. In some embodiments, the data analyzer 310 generates a report indicating the results of the analysis performed by the data analyzer 310. For example, in some embodiments, the report indicates results representing detected changes in configuration(s), abnormal functionality, or other incident(s) detected based at least in part on the structured log(s), device list, and/or baseline data 312.

In some embodiments, the data analyzer 310 initiates an alert in response to detection of one or more anomalies, changes, incidents, and/or the like from the analysis performed. For example, in some embodiments, the data analyzer 310 generates an alert identifying a particular change, anomaly, incident, and/or the like, and/or associated node(s) that are associated with such a change, anomaly, incident, and/or the like. The data analyzer 310 in some embodiments provides the alert to an administrator device 314. In some such embodiments, the data analyzer 310 causes rendering of the alert to the administrator device 314 for displaying to an administrator. For example, in some embodiments, the data analyzer 310 transmits the alert or data embodying particular data of the alert to the administrator device 314 to cause the administrator device 314 to render a particular user interface embodying the alert to a display of the administrator device 314. In some such embodiments, an administrator of the administrator device 314 may review the alert and determine whether to grant access for the node to the network or remove access for the node to the network. In some embodiments, the data analyzer 310 may set an access indicator based at least in part on data received in response to user engagement of the alert at the administrator device 314. In a circumstance where the administrator approves access for a node, the data analyzer 310 may facilitate generation and/or updating of one or more data record(s) to one or more database(s) that indicate and/or facilitate the grant of access. For example, in some embodiments, the data analyzer 310 may push a new data record, or updates to a data record, to one or more of a node database, a metadata database, and/or a log database based at least in part on an access indicator representing the response by the administrator to the alert. In some such embodiments, the data pushed to the database(s) may be based at least in part on the structured log(s) and/or data the associated therewith for the node(s) and/or corresponding message communication(s).

In some embodiments, a detected change, anomaly, incident, and/or the like, is automatically processed. For example, in some embodiments, the data analyzer 310 determines whether a change is associated with a trusted device, for example embodying a previously approved node for connection and/or a newly connected node that should be granted access to the network. In this regard, the data analyzer 310 in some embodiments initiates a process for automatically managing access to the network as described herein. Such an automatic process may be performed in addition to and/or alternative from a manual process for controlling access to the network, for example performed by an administrator of the administrator device 314.

In some embodiments, the report representing the results and/or the data record(s) pushed to the database(s) based at least in part on the analysis is pushed from the data analyzer 310 to the baseline data report center 316. In some embodiments, the report center 316 includes data representing such report(s) and/or related data updates for processing and/or presenting via a user interface. For example, in some embodiments, the report center 316 maintains such data for indicating the status of nodes via a user interface that is provided to the administrator device 314, as described herein.

Figure 4:
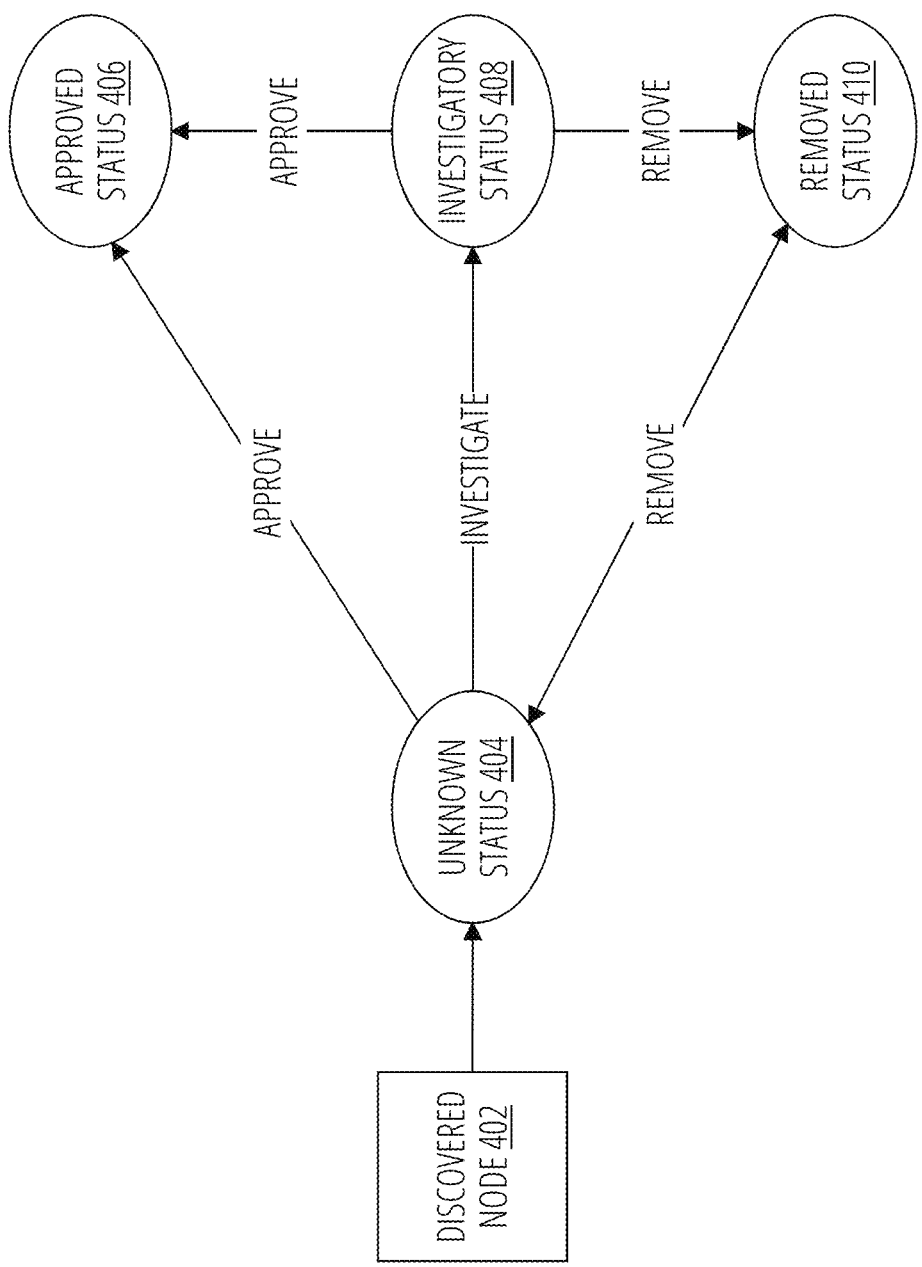
FIG. 4 illustrates an example flowchart of access indicator values in accordance with at least some example embodiments of the present disclosure.

FIG. 4 illustrates an example flowchart of access indicator values in accordance with at least some example embodiments of the present disclosure. Specifically, FIG. 4 depicts the possible transitions between particular candidate statuses for an access indicator corresponding to a particular node, for example the discovered node 402. In some embodiments, the discovered node 402 embodies or includes a node newly discovered on the network from one or more message communication(s), and/or requesting connection to the network via the apparatus 200. Accordingly, the discovered node 402 may embody an unknown node or a node for which an access indicator has not yet been determined. In this regard, the apparatus 200, for example, may operate in a manner that automatically, and/or in response to user engagement, transitions between the values representing statuses of the access indicator as depicted. In some such embodiments, the apparatus 200 may transition the discovered node 402 from one status to another by updating the value of an access indicator corresponding to the discovered node 402 to one of a plurality of candidate statuses, for example unknown status 404, approved status 406, investigatory status 408, and/or removed status 410. In some embodiments, the apparatus 200 stores the current value for the access indicator corresponding to a particular node in one or more database(s), as described herein.

In some embodiments, the apparatus 200 assigns a default status as the value of the access indicator upon detection. In some embodiments, for example, the default status is embodied by the unknown status 404. In some embodiments, an unknown node (e.g., having an access indicator set to the unknown status) can be transitioned to an approved status 406, for example automatically or in response to user engagement, upon receiving data or performing a determination indicating that the discovered node 402 is approved as granted access to the network. Additionally or alternatively, in some embodiments, an unknown node can be transitioned to a removed status 410, for example automatically or in response to user engagement, upon receiving data or performing a determination indicating that the discovered node 402 is not approved for accessing the network. Additionally or alternatively still, in some embodiments, an unknown node can be transitioned to an investigatory status 408, for example automatically, in a circumstance where the discovered node 402 cannot be automatically determined as associated with an approved status 406 or a removed status 410.

In some embodiments, a node associated with an investigatory status 408 can be transitioned based at least in part on user engagement. For example, an administrator associated with an administrator device may utilize a particular user interface, as described herein, to review data associated with the discovered node and provide user engagement indicating whether to transition to the approved status 406 or the removed status 410. Additionally or alternatively, in some embodiments, the discovered node 402 may be transitioned back to the unknown status 404.

Figure 5:
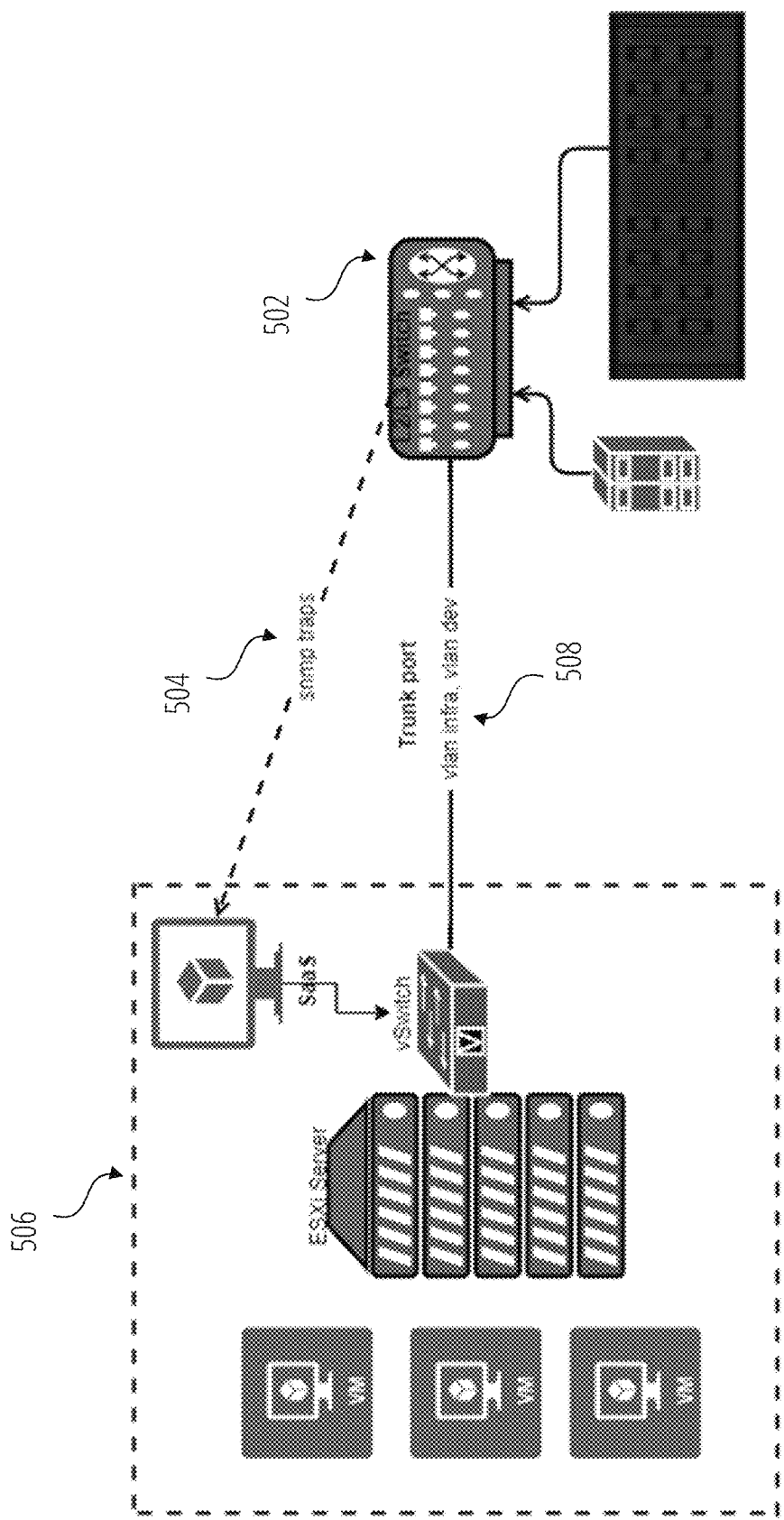
FIG. 5 illustrates an example visualization of a system for SNMP trap listening in accordance with at least some example embodiments of the present disclosure.

FIG. 5 illustrates an example visualization of a system for SNMP trap listening in accordance with at least some example embodiments of the present disclosure. In this regard, the system depicted and described with respect to FIG. 5 may perform network monitoring for a particular network, for example a wireless OT network. Such network monitoring may be utilized to detect and/or notify a system of alert(s) as particular event(s) is/are detected for a particular sub-network (e.g., a VLAN).

As depicted, FIG. 5 depicts such network monitoring for a VLAN domain 506. The VLAN domain 506 includes a plurality of virtual machines, for example facilitated via an ESXi server or similar implementation(s). Additionally, in some embodiments, the VLAN domain 506 includes a vSwitch embodied at least in part via the ESXi server. For example, in some embodiments, the vSwitch facilitates connection of the virtual machines maintained via the ESXi server to a particular network, for example a wireless OT network facilitated at least in part by the L2/L3 switch 502. In some embodiments, the vSwitch and/or ESXi server configuration is/are accessible via at least one remote service, for example a software as a service offering that enables access to the vSwitch, virtual machines, and/or other portion(s) of the ESXi server. Additionally or alternatively, in some embodiments, the L2/L3 switch 502 may be connected to a remaining portion of the wireless OT network, other VLAN domain(s), and/or the like.

In some embodiments, the VLAN domain 506 is connected to the L2/L3 switch 502 via the trunk port 508. In some embodiments, the trunk port 508 enables data flow in a manner that is VLAN aware for one or more VLANs. In this regard, the trunk port 508 may be utilized for a myriad of traffic to and/or from the VLAN domain 506, including communication of SNMP trap notification message(s) as described herein.

In some embodiments, the L2/L3 switch 502 receives data event messages associated with the operation and/or configuration of the L2/L3 switch 502. In some embodiments, one or more of such event message(s) is/are received via SNMP traps 504 facilitated between the VLAN domain 506 and the L2/L3 switch 502. For example, in some embodiments, the L2/L3 switch 502 functions as a SNMP manager for a SNMP agent operating via the software as a service application provided for interacting with the vSwitch and/or ESXI server, or otherwise controlling the VLAN domain 506. In some embodiments, the SNMP traps 504 includes a specially configured SNMP trap listener that is configured to parse particular received SNMP notification messages in a particular manner. In some embodiments, the SNMP traps 504 includes one or more deep learning SNMP traps and/or parsers, for example that parse SNMP trap MAC notification(s) into IP address data to which the notification relates and/or MAC address data to which the notification relates. Additionally or alternatively, in some embodiments, the L2/L3 switch 502 (for example including or embodying the apparatus 200 as a subsystem, for example) utilizes a specially configured SNMP trap parser, such as a MAC SNMP trap parser that parses MAC address data from a received SNMP MAC trap notification message.

Additionally or alternatively, in some embodiments, the system includes a MAC to IP resolver. The MAC to IP resolver may translate a MAC SNMP trap notification to a corresponding IP address. Additionally or alternatively, in some embodiments, the resolver may initiate a scan for investigation of the notification message. Additionally or alternatively, in some embodiments, the system utilizes a reverse ARP protocol (or similar reverse protocol) that determines an IP address using a link-layer address, such as MAC address data or the like, for the notification message. In some embodiments, the L2/L3 switch 502 utilizes a MAC caching mechanism that maintains uniqueness between incoming MAC SNMP trap notification messages.

In some embodiments, the SNMP traps 504 utilize a particular structure for MAC SNMP trap notification messages. For example, in some embodiments, the L2/L3 switch 502 receives a MAC SNMP trap notification message representing a MAC change notification event. The object received in some embodiments includes a plurality of tuples in a format of "<tuple_1>, <tuple_2> . . . <tuple_N>." In some such embodiments, each tuple includes 11 octets in the format of "<operation><VLAN><MAC><dotldBasePort>." In such a structure, the "<operation>" tuple is of size 1 octet and supports one of the following values: "0" indicating end of MIB object, "1" indicating MAC address data was learned, and/or "2" indicating MAC address data was removed. Further, in such a structure, the "<VLAN>" tuple is a number of the VLAN which the MAC address data associated with the SNMP notification belonged to, and has a size of 2 octet. Additionally or alternatively still, in such a structure, the "<MAC>" represents the layer 2 MAC address data associated with the notification message (e.g., a data link layer MAC address), and has a size of 6 octets. Additionally or alternatively still, in some such a structure, the "<dotldBasePort>" is the value of dotldBasePort for the interface from which the MAC address data is learned, and has a size of 2 octets. In this regard, the MAC SNMP trap notification message(s) received may be parsed and/or otherwise processed to determine data utilized in subsequent operations, for example MAC address data, and/or the like, utilized in one or more of the operations performed for managing access to a wireless OT network as described herein.

Figure 6:
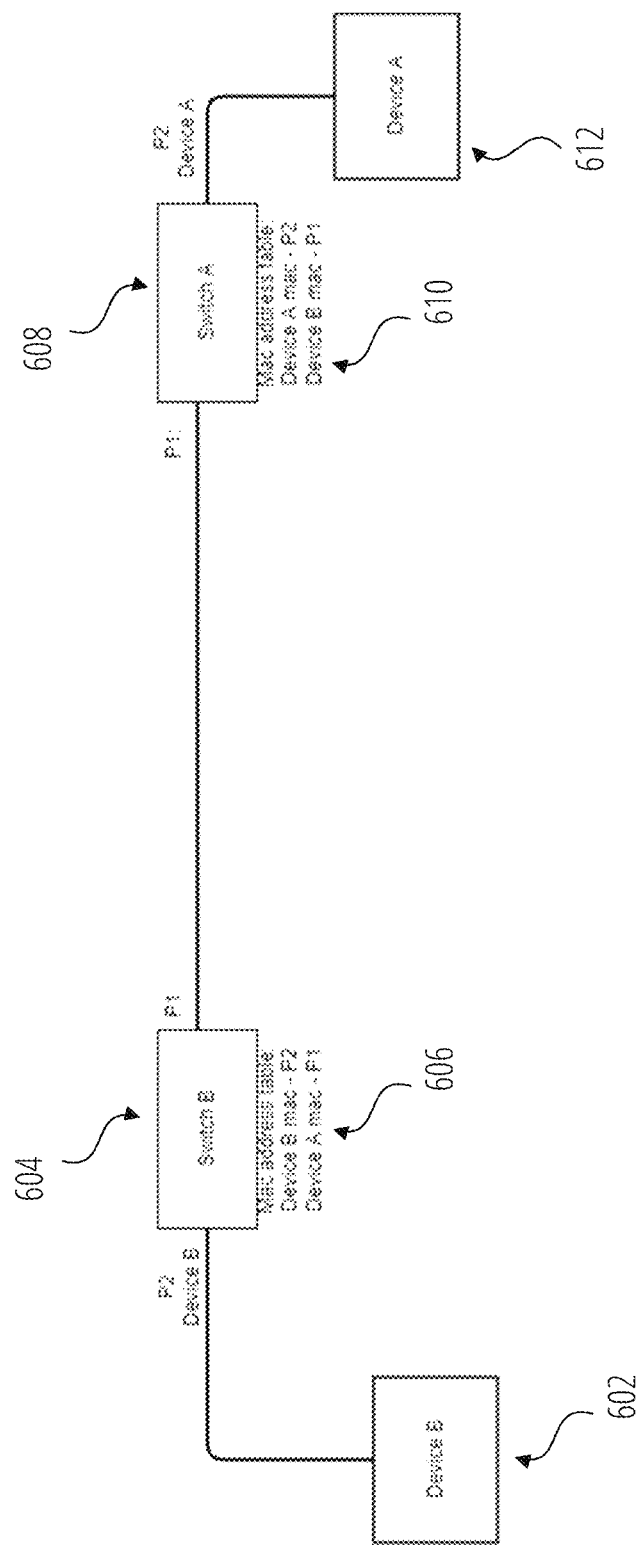
FIG. 6 illustrates a visualization of switch IP and port data processing in accordance with at least some example embodiments of the present disclosure.

FIG. 6 illustrates a visualization of node connection data processing in accordance with at least some example embodiments of the present disclosure. Specifically, FIG. 6 depicts an example sub-network processable for detecting and/or analyzing node connection data for one or more node(s) on a network, for example switch IP address data and port data. In some embodiments, the apparatus 200 performs such processing as described for a particular network to determine node connection data usable to generate a network topology and/or otherwise identify connection(s) between nodes of a network.

FIG. 6 depicts examples nodes of a network that include edge node 602, edge node 612, switch 604, and switch 608. The edge node 602 is connected to the switch 604, and the edge node 612 is connected to the switch 608. Additionally, as illustrated, switch 604 is connected to the switch 608. In some embodiments, one or more of such connection(s) may be embodied by a wireless connection facilitated utilizing a wireless communication protocol. Additionally or alternatively, in some embodiments, one or more of the connection(s) is facilitated utilizing a wired connection and wired communication protocol.

Each of the switches 604 and 608 is associated with corresponding node connection data. Specifically, switch 604 is associated with node connection data 606, and node 608 is associated with node connection data 610. In some embodiments, the node connection data includes a MAC address table for end nodes communicable via the switch. For example, node connection data 606 includes a first MAC address table including a first data record including MAC address data corresponding to the edge node 602 and corresponding switch port data of the switch 604 for the connected edge node 602, and a second data record including MAC address data corresponding to the edge node 612 and corresponding switch port data of the edge node 612. As depicted, the node connection data 606 includes switch port data associating port 1 of the switch 604 with the MAC address data for the edge node 602, and includes switch port data associating port 2 of the switch 604 with the MAC address data for the edge node 612. In this regard, utilizing such node connection data 606 the is usable to route data, for example message communication(s), using port 2 via the switch 608. Similarly, the node connection data 610 includes switch port data associating port 1 of the switch 608 with the MAC address data for the edge node 602, and includes switch port data associating port 2 of the switch 608 with the MAC address data for the edge node 612. In this regard, utilizing such node connection data 610 is usable to route data, for example message communication(s), using port 1 of the switch 608.

In some embodiments, the system is analyzed, for example by the apparatus 200, by collecting particular data maintained by one or more of the node(s), for example by each system of the system. In some embodiments, one or more data discovery processing protocol(s). For example, in some embodiments, Cisco Discovery Protocol data and/or Link Layer Discovery Protocol data is identified for each switch, or similarly configured node, on the network. It will be appreciated that, in other embodiments, one or more other layer 2 processing protocol(s) may be utilized.

The apparatus 200 collects MAC address tables for the switches of the network, for example switch 604 and switch 608. In some embodiments, the MAC address tables are collected based at least in part on the collected CDP and/or LLDP data. Each MAC address table may include the switch port data and corresponding MAC address data for a particular node connected to the network, for example an edge node embodying an OT device. In some embodiments, the MAC address table collection is triggered upon detecting an unknown device entering the trunk port, which raises an alarm corresponding to the event. In some embodiments, the full MAC address table, including the trunk port data, is sent to a particular database, for example the node database. Additionally or alternatively, in some embodiments, the MAC address table is saved to a file for further processing.

In a circumstance where an untrusted or unknown node is detected, for example by the apparatus 200, subsequent processing may occur. For example, in some embodiments, the apparatus 200 collects the MAC address profiles in a circumstance where an untrusted or unknown node is detected. The apparatus 200 creates a dictionary with each switch name and corresponding MAC address data in the MAC address table for that switch. In this regard, the dictionary may be utilized to determine if any switch includes the MAC address data for the unknown or untrusted node in the MAC address table for that switch. In a circumstance where the MAC address data corresponding to the untrusted or unknown node is not found in the dictionary, new data corresponding to the unknown or untrusted node may be generated. The apparatus 200 may subsequently attempt to identify the switch port data for a particular switch, where the switch port data corresponds to the MAC address data for the untrusted or unknown node utilizing the process described above. In some embodiments, the MAC address table stored to a particular database, such as the nodes database, is maintained and utilized for finding a specific port for each switch in the network.

Figure 7:
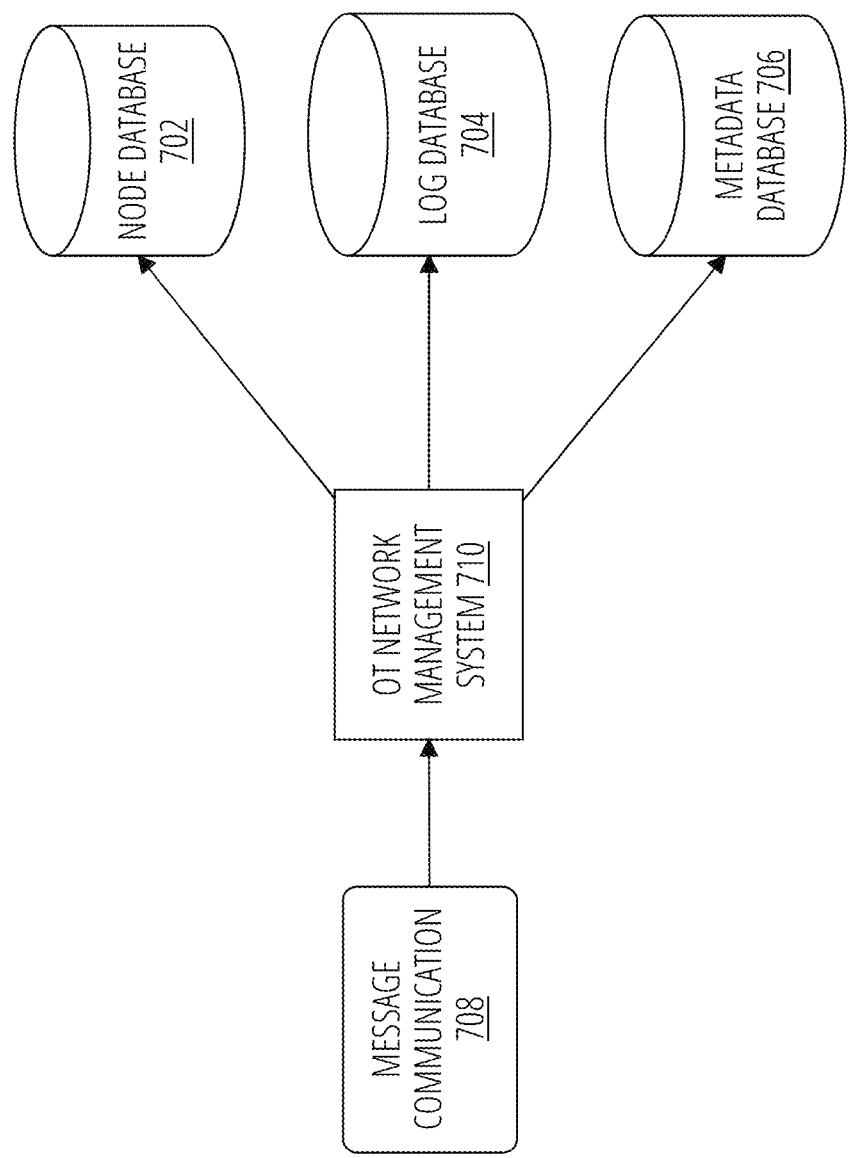
FIG. 7 illustrates databases maintained in accordance with at least some example embodiments of the present disclosure.

FIG. 7 illustrates databases maintained in accordance with at least some example embodiments of the present disclosure. For example, as illustrated, the databases are maintained by one or more computing device(s), for example the OT Network Management System 710. In some embodiments, the OT Network Management System 710 is embodied by the apparatus 200.

As illustrated, the OT Network Management System 710 includes a node database 702, a log database 704, and a metadata database 706. It should be appreciated that, in some embodiments, each of the databases 702, 704, and 706 are embodied as separate data repositories. For example, in some embodiments each of the 702, 704, and 706 are embodied by separate hardware, software, firmware, and/or any combination thereof. Additionally or alternatively, in some embodiments, the 702, 704, and 706 are embodied as sub-databases of a shared higher-level database. Additionally or alternatively, in some embodiments, each of the databases 702, 704, and 706 is embodied by a separate table of a particular data. Additionally or alternatively still, in some embodiments, one or more of the databases 702, 704, and 706 is embodied by a cloud or other remote database separate from and accessible to the apparatus 200.

In some embodiments, each of the node database 702, log database 704, and metadata database 706 is configured to store data utilized for a particular purpose. In some embodiments, the node database 702 embodies a first database configured to store information corresponding to each node connected to an OT network. For example, in some embodiments, the node database 702 stores information identifying each node connected to a particular network, each node attempting to connect to a particular network, and/or each node associated with an approved status for connection to the network. In some embodiments, the node database includes one or more data records indicating such data for each node. Non-limiting examples of data stored to a data record of the node database include a device identifier, node address information (e.g., MAC address information, IP address information, hostname information, and/or the like), a vendor indicator, operating system data, TCP transfer data, UDP transfer data, configuration data, settings data, and/or services data associated with a particular node. Additionally or alternatively, in some embodiments, the node database 702 includes a MAC address table for one or more node(s) on the network, for example each switch on the network. In some embodiments, the node database includes data associated with each detected nodes, including unknown node(s), approved node(s), and/or removed node(s).

In some embodiments, the node database 702 stores a dictionary and/or array of data record(s). For example, in some embodiments, the node database 702 stores a database having a key that represents a node identifier for the node corresponding to the data record. The corresponding value of said key in some embodiments include another data object having a plurality of key-value pairs associated with configuration details of the node. For example, in some embodiments, an example data record includes the following JSON object structure:

```
{
  "0ea9c8f3-e8a3-892f-a1cb-4caac7232292": {
    "mac": "00:50:56:8c:4f:eb",
    "ip": "172.18.0.15",
    "hostname": "R510FLX",
    "vendor": "VMware",
    "os": "Windows 7 or 8",
    "role": "Experion Flex",
    "tcp": [
      80, 135, 139, 445, 3389, 5357, 5985
    ],
    "udp": [
      137
    ],
    "services": [
      " Experion PKS Control Data Access Server",
      "Experion PKS Add Route (FTE)",
      "Experion PKS BOOTP Server",
      "Experion PKS CDA-SP Service",
      "Experion PKS Checkpoint Service",
      "Experion PKS EMDB Server",
    ]
  }}
```

Additionally or alternatively, in some embodiments, the log database 704 embodies a second database configured to store information embodying data log(s) associated with node operations of a network. For example, in some embodiments, the log database 704 stores data log(s) that represents operations performed automatically and/or by an administrator for setting an access indicator for a particular node. Additionally or alternatively, in some embodiments, the log database 704 includes one or more administrator log(s) associated with each node of a wireless OT network for which an operation was performed. Non-limiting examples of administrator log(s) stored to data record of the log database includes a device identifier for a node, a timestamp associated with an action, administrator identification information for an administrator that performed an action associated with the node, an access indicator corresponding to the node at the time of the operation, note data from the administrator that performed an operation with respect to the node, and/or the like.

In some embodiments, the log database 704 stores a dictionary and/or array of data record(s). For example, in some embodiments, the log database 704 stores a database having a key that represents a node identifier for the node corresponding to the data record. The corresponding value of said key in some embodiments includes an array or dictionary of data object(s), each data object embodying a report of an operation performed for setting an access indicator (e.g., a "state" or "status") for the node. For example, in some embodiments, an example data record stored by the log database 704 includes the following JSON object structure:

```
{
  "0ea9c8f3-e8a3-892f-a1cb-4caac7232292": [
    {
      "timestamp": 1628769715.090557,
      "full_name": "",
      "state": "pending",
      "note": "detected on switch x.x.x.x"
    },
    {
      "timestamp": 1628769715.090557,
      "full_name": "",
      "state": "pending",
      "note": "detected on switch y.y.y.y"
    }
  ]
}
```

Additionally or alternatively, in some embodiments, the metadata database 706 embodies a third database configured to store information embodying metadata associated with connection(s) of a node and/or operations performed by the node. For example, in some embodiments, the metadata database 706 stores any detected, parsed, and/or generated metadata associated with any node associated with connection to the network. Additionally or alternatively, in some embodiments, the metadata database 706 includes any such metadata associated with each node connected to the particular network, each node attempting to connect to the particular network and/or each node associated with an approved status for connection to the network. Non-limiting examples of data stored to a data record of the metadata database 706 include a device identifier for a node, an access indicator corresponding to the node, resolution information, a first seen indicator, a last seen indicator, a last updated indicator, connected switch information, and/or the like.

In some embodiments, the metadata database 706 stores a dictionary and/or array of data record(s). For example, in some embodiments, the metadata database 706 stores a database having a key that represents a node identifier for the node corresponding to the data record. The corresponding value of said key in some embodiments includes a custom data object including key-value pairs associated with metadata associated with the node. For example, in some embodiments, an example data record stored by the metadata database 706 includes the following JSON object structure:

```
{
  "0ea9c8f3-e8a3-892f-a1cb-4caac7232292": {
    "state": "pending",
    "resolution": "",
    "first seen": "",
    "last seen": "",
    "last update": "",
    "switches": {
      "192.168.1.1": {
        "first_trap": "timestamp",
```

```
        "last_trap": "timestamp",
        "port": "",
    },
    "192.168.1.2": {
        "first_trap": "timestamp",
        "last_trap": "timestamp"
    }
  }
}
```

In some embodiments, the apparatus 200 stores data to one or more of the databases 702, 704, and/or 706 based at least in part on received message communication(s), such as the message communication 708. For example, in some embodiments, MAC address data and/or other node address information identified from the message communication 708 is utilized to update the node database 702, for example to include a new data record corresponding to the node. Additionally or alternatively, metadata parsed from and/or derived from the message communication 708 is utilized to update the metadata database 706, for example to update a last seen data value, a state data value, and/or switch connection data represented in a particular data record corresponding to the node associated with the message communication 708. Additionally or alternatively, in some embodiments, data resulting from an operation for managing access of the corresponding node in response to the message communication 708 may be utilized to update the log database 704, for example to include a new data log for an automatically or manually performed operation.

In some embodiments, the apparatus 200 accesses one or more of the databases 702, 704, and/or 706 to perform any of a myriad of operations. For example, in some embodiments, the apparatus 200 may utilize data from one or more of the databases to determine a current access indicator for a particular node. Additionally or alternatively still, in some embodiments, the apparatus 200 may utilize data from the databases to detect changes, anomalies, and/or deviations in the network at different points in time.

Example User Interfaces of the Disclosure

FIG. 8 illustrates an example user interface in accordance with at least some example embodiments of the present disclosure. Specifically, FIG. 8 depicts an example user interface 800. The user interface 800 is specially configured to include data associated with unknown nodes and/or removed nodes for a particular network. It will be appreciated that, in some embodiments, a user interface may be provided for only depicting unknown nodes, or a user interface may be provided for only removed nodes. Additionally or alternatively, in some embodiments a similar user interface may be provided that includes data for nodes associated with each status of access indicator (e.g., including approved nodes).

In some embodiments, the apparatus 200 generates and/or otherwise causes rendering of the user interface 800. In some embodiments, the apparatus 200 causes rendering of the user interface 800 to an administrator device. In some embodiments, the apparatus 200 generates and transmits the user interface 800 to the administrator device for rendering. Alternatively, in some embodiments the apparatus 200 transmits one or more message communication(s) including data utilized by the administrator device to render the user interface 800. For example, in some embodiments, the apparatus 200 identifies and/or transmits a data record including each portion of data to be rendered to the user interface 800.

As illustrated, the user interface 800 includes a sub-interface toggle 806 and a sub-interface toggle 808. In some embodiments, the sub-interface toggle 806 and sub-interface toggle 808 control the data rendered to the table depicted in the user interface 800. For example, in some embodiments, a user may engage the sub-interface toggle 806 to cause rendering to the user interface 800 of data associated with unknown nodes, and may engage the sub-interface toggle 808 to cause rendering to the user interface 800 of data associated with removed nodes. In this regard, the sub-interface toggle 806 and sub-interface toggle 808 may be utilized to switch between views associated with such types of nodes.

The user interface 800 further includes a table with columns corresponding to a plurality of data parameters. Specifically, the sub-interface toggle 806 is associated with the parameters 802, including a node alias, a node host name, a node MAC address, a node IP address, a first detected timestamp, a last detected timestamp, a status timestamp (e.g., indicating a value representing an access indicator associated with the node). It will be appreciated that in other embodiments, the user interface 800 may include any of a myriad of other parameter(s) useful to an administrator in setting an access indicator for the node. The table includes a plurality of data records, each corresponding to a particular node (e.g., an unknown node as depicted, for example where the sub-interface toggle 806 is engaged). Specifically, the user interface 800 includes data records 804a-804c. In this regard, the data record 804a includes data corresponding to a first node, for example indicating that the node is associated with a dynamic alias, a server hostname, MAC address data of "3C-F0-11-EB-EE-4D," and IP address data of "192.168.0.106." Each data record 804a-804c includes different data values specific to the corresponding node for each parameter represented in the table. In some embodiments, an administrator may review the data rendered to the table of the user interface 800 and/or provide user engagement associated with the particular data record(s) and/or corresponding user interface elements (not depicted) to assign an updated access indicator for the corresponding node, for example to update the access indicator from representing an unknown status or investigatory status to an approved status or removed status. In some embodiments, the apparatus 200 causes dynamic updating of the user interface 800 as new nodes are detected and/or set to an updated access indicator.

Example Topology Mapping of the Disclosure

Figure 9:
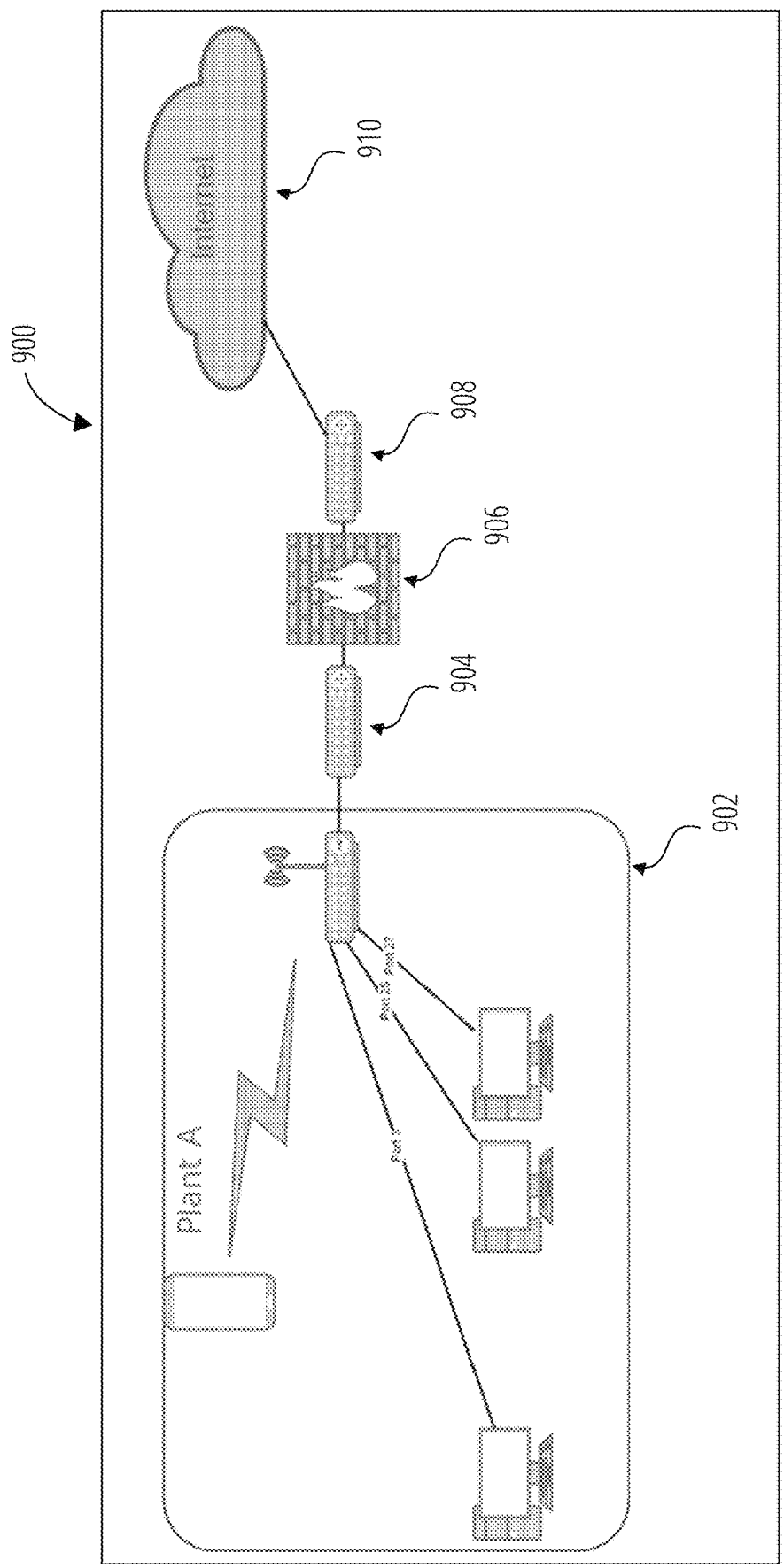
FIG. 9 illustrates a visualization of a network topology in accordance with at least some example embodiments of the present disclosure.

FIG. 9 illustrates a visualization of a network topology in accordance with at least some example embodiments of the present disclosure. Specifically, FIG. 9 depicts a network topology 900. In some embodiments, the network topology 900 is generated by the apparatus 200. In some embodiments, the apparatus 200 generates the network topology 900 based at least in part on node connection data and/or node address information for each of plurality of nodes connected to a network, for example where such data is stored by the apparatus 200 in one or more database(s). In some embodiments, the apparatus 200 retrieves switch port data for each switch of the network, for example where such switch port data includes a port of a switch associated with routing to a MAC address associated with a particular node, for example representing a wireless OT device connected to the network. In some such embodiments, the apparatus 200 may iterate through switch port data and MAC address data for each node of the network to determine the connections between each node of the network, wherein the network topology is defined based at least in part on the connections between nodes identified as connected to the network.

As illustrated, the network topology 900 includes a sub-network 902. In some embodiments, the sub-network 902 includes nodes of a particular industrial plant, for example plant A as depicted. Each of the end nodes (e.g., OT devices and/or other IIOT devices) is associated with a different port of a shared switch. In this regard, for example, the apparatus 200 may identify a MAC address table based at least in part on node connection data associated with the shared switch that indicates the port corresponding to the MAC address data for each node communicable via the port. Additionally, the network topology 900 includes a node 904 representing a higher layer network switch, a node 906 representing a firewall of the network, a node node 908 representing a DMZ switch, for example, and an external network portion 910. In some embodiments, the apparatus 200 may similarly receive a MAC address table and/or other node connection data for each of the node 904, node 906, and/or node 908 that indicate the particular connections between each of such nodes. For example, in some embodiments, the apparatus 200 maintains a MAC address table that includes a port and corresponding MAC address data for each of the switches of the network. In this regard, the apparatus 200 may generate the network topology 900 by iterating through the MAC address tables to determine connected switches, the configuration of such connected switches in the topology, end devices of the network, and the like. It will be appreciated that, in some embodiments, some or all of the data utilized to generate the network topology is parsed from one or more message communication(s), and/or identified by the apparatus 200 in response to detecting particular message communication(s) (e.g., associated with an unknown node or untrusted node).

In some embodiments, the apparatus 200 stores the network topology 900 for processing. Additionally or alternatively, in some embodiments, the apparatus 200 provides the network topology 900 for rendering. For example, in some embodiments, the apparatus 200 pushes the network topology 900 to an administrator device for review and/or engagement by an administrator.

Example Processes of the Disclosure

Having described example systems and apparatuses, related data flows, data architectures, user interfaces, and network topology use cases in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 10:
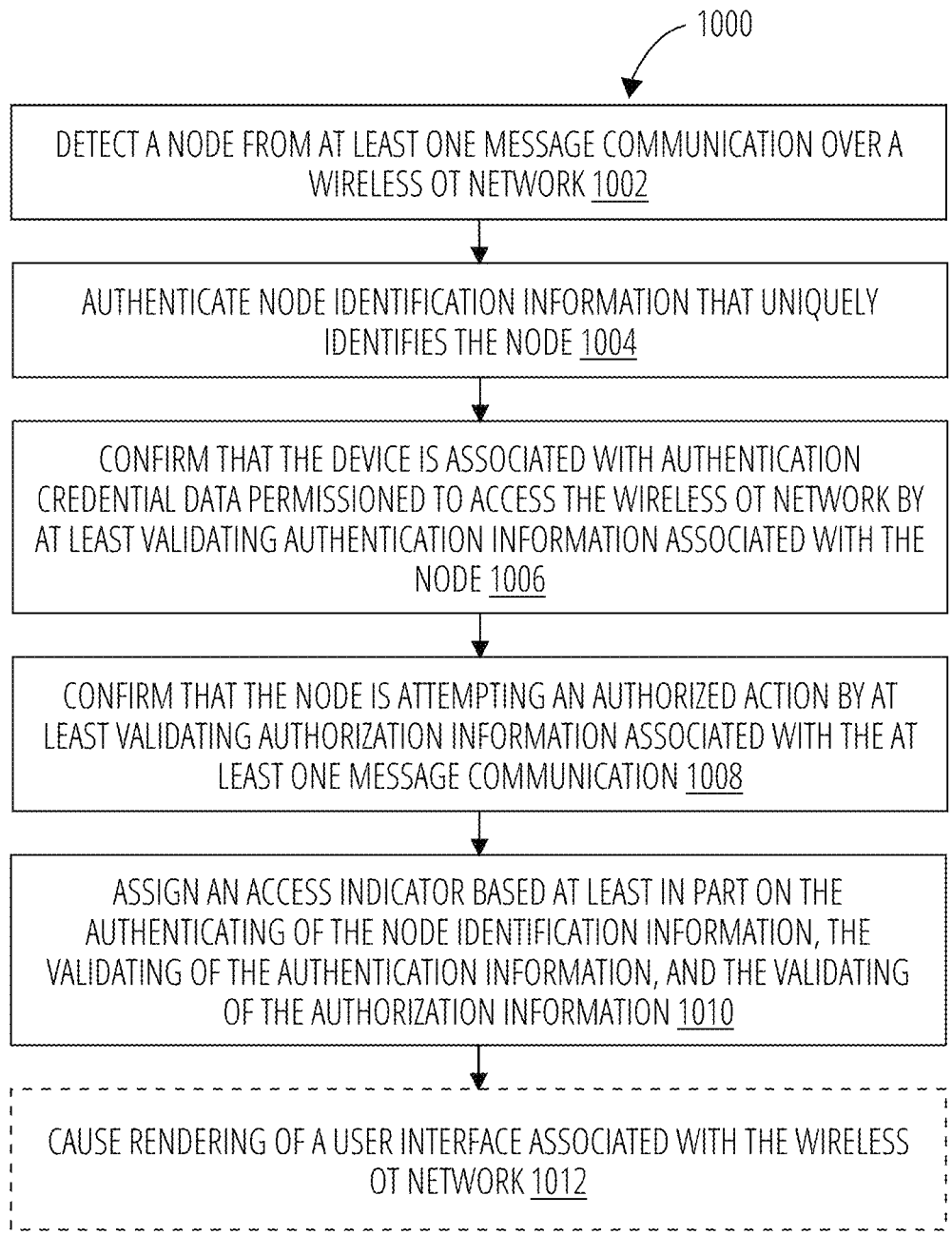
FIG. 10 illustrates a process 1000 for managing access of wireless devices to a wireless OT network in accordance with one embodiment.

FIG. 10 illustrates a process 1000 for managing access of wireless devices to a wireless OT network in accordance with one embodiment. The process 1000 embodies an example computer-implemented method. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1000 is described as performed by and from the perspective of the apparatus 200.

According to some examples, the method includes detecting a node from at least one message communication over a wireless OT network at operation 1002. In some embodiments, the apparatus 200 determines the node associated with a particular detected message communication by extracting node identification information from the at least one message communication. For example, in some embodiments, the apparatus 200 parses and/or extracts a MAC address, IP address, device identifier, and/or the like from the at least one message communication that indicates a particular node that originated the message communication.

In some embodiments, the apparatus 200 detects each message communication as it reaches the apparatus 200, or related device, for propagation to an intended target endpoint. In some embodiments, the apparatus 200 is disposed within a particular device layer of the wireless OT network to facilitate "listening" to each of the message communications transmitted via the wireless OT network. For example, in some embodiments, the apparatus 200 is disposed in the L3 layer of the wireless OT network to facilitate detection of both wirelessly communicated message communication(s) (e.g., from nodes connected to the wireless OT network via a wireless connection), and/or wired message communication(s) (e.g., from nodes connected to the wireless OT network via a wired connection). It should be appreciated that the wireless OT network may include one or more wirelessly connected devices, or in other embodiments include only wirelessly connected edge devices, and/or the like.

According to some examples, the method includes authenticating node identification information that uniquely identifies the node at operation 1004. In some embodiments, some or all of the node identification information is extracted from the at least one message communication. Additionally or alternatively, in some embodiments, the apparatus 200 retrieves some or all of the node identification information from at least one database accessible to the apparatus 200. For example, in some embodiments, the apparatus 200 retrieves at least a portion of the node identification information based at least in part on a device identifier parsed and/or extracted from the at least one message communication. Non-limiting examples of node identification information include a MAC address associated with the node, an IP address associated with the node, a device identifier associated with the node, and/or related metadata information associated with the node that may be validated by comparison with information parsed from the at least one message communication (e.g., a device type, a device operating system, and/or the like) to verify the authenticity of the node as a source of the at least one message communication. In some embodiments, the apparatus 200 authenticates the node identification information utilizing one or more rule set(s) that validate the message communication as originating or otherwise associated with the node represented by such node identification information.

According to some examples, the method includes confirming that the device is associated with authentication credential data permissioned to access the wireless OT network by at least validating authentication information associated with the node at operation 1006. The authentication information includes credential(s), token(s), and/or other permissioned-based data associated with accessing the wireless OT network. In some embodiments, the authentication information is additionally or alternatively associated with a particular action to be initiated and/or performed based at least in part on the at least one message communication (e.g., a particular function requested to be executed by the at least one message communication). In some embodiments, the authentication information is parsed and/or otherwise extracted from the at least one message communication. In some embodiments, the apparatus 200 maintains at least one database including permissioned authentication information that has been granted access to the wireless OT network. In this regard, if the received authentication information is found in such a database, for example based at least in part on a query corresponding to a node based at least in part on the node identification information and/or the like, the apparatus 200 may determine that the authentication credential data is valid. In some such embodiments, the apparatus 200 may determine that the authentication credential data for the node is not valid in a circumstance where the permissioned authentication information does not include the authentication credential data received associated with the at least one message communication.

According to some examples, the method includes confirming that the node is attempting an authorized action by at least validating authorization information associated with the at least one message communication at operation 1008. In some embodiments, the authorization information includes data representing a requested functionality, action, or purpose associated with the at least one message communication. In some embodiments, the authorization information is derived based at least in part on data in the at least one message communication, for example an endpoint associated with the at least one message communication, request payload data, and/or the like. Additionally or alternatively, in some embodiments, the apparatus 200 determines whether the authorization information indicating a requested action is permissioned to perform such an action, for example based at least in part on permissions associated with the node, and/or permissions granted based on valid authentication information as described above. In this regard, the apparatus 200 may determine that the authorization information is associated with an authorized action in a circumstance where the authorization information is determined as associated with an action that the device and/or authentication information is permissioned to perform.

According to some examples, the method includes assigning an access indicator based at least in part on the authenticating of the node identification information, the validating of the authentication information, and the validating of the authorization information at operation 1010. In some embodiments, the apparatus 200 assigns an access indicator representing an approved status in a circumstance where each of the authentication of the node information, the validation of the authentication information, and the validation of the authorization information was successful. Additionally or alternatively, in some embodiments, the apparatus 200 assigns an access indicator representing an investigatory status in a circumstance where one or more of the validations was unsuccessful, for example unsuccessful authentication of the node identification information, unsuccessful validation of the authorization information, and/or unsuccessful validation of the authentication information. Additionally or alternatively, in some embodiments the apparatus 200 assigns an access indicator representing a removed status in a circumstance where one or more of the validations was unsuccessful, for example in a circumstance where the authorization information indications attempting an action that is not allowed.

In some embodiments, the apparatus 200 automatically assigns an access indicator representing an investigatory status to the node in a circumstance where the node is newly detected, regardless of the results of the validations as depicted and described with respect to 1004, 1006, and/or 1008. Additionally or alternatively in some embodiments the apparatus 200 automatically assigns an access indicator representing an investigatory status to the node in a circumstance where any of the validations is unsuccessful. In some such embodiments, the access indicator may be updated only via user engagement by an administrator utilizing one or more user interface, as described further herein.

According to some examples, the method includes causing rendering of a user interface associated with the wireless OT network at optional operation 1012. In some embodiments, the apparatus 200 causes rendering of the user interface to an administrator device. For example, in some embodiments, the apparatus 200 transmits one or more message communication(s) to the administrator device, where the administrator device utilizes such data to render the user interface. Additionally or alternatively, in some embodiments, the apparatus 200 causes rendering of the user interface to a display embodied as part of or otherwise communicatively coupled with the apparatus 200. Non-limiting examples of the user interface include a GUI rendered via a native application executed on the administrator device, a GUI rendered via a web application accessed via a browser executed on the administrator device, and/or the like.

In some embodiments, the user interface includes at least one sub-interface indicating each node associated with an investigatory status. Additionally or alternatively, in some embodiments, the apparatus 200 may cause rendering of interface element(s) that enable updating of the access indicator corresponding to a particular node represented in the user interface, for example to update the access indicator corresponding to the node represented in the user interface to an approved status or a removed status. Additionally or alternatively, in some embodiments, the user interface includes at least one sub-interface indicating each node associated with a removed status. Additionally or alternatively, in some embodiments, the apparatus 200 may cause rendering of interface element(s) that enable updating of the access indicator corresponding to the particular node, for example to an approved status from removed or back to an investigatory status.

Additionally or alternatively, in some embodiments, the user interface includes other data associated with the node that is determined to be pertinent to an administrator. For example, in some embodiments, the user interface includes MAC address data, IP address data, hostname data, alias data, node identification information, authorization information, authentication information, and/or the like, corresponding to the node and/or one or more message communication(s) associated therewith. In some embodiments, the apparatus 200 causes rendering of the user interface as a table including a different data record for each node that is represented in the user interface. In some embodiments, an administrator may view and/or engage with the apparatus 200 for any of a myriad of purposes, for example to review performed operations with respect to managing access associated with such node(s) of a wireless OT network, update access of certain node(s) based at least in part on the data represented in the user interface, and/or the like, as described herein. At least a portion of the user interface in some embodiments includes the user interface 800 as depicted and described herein.

Figure 11:
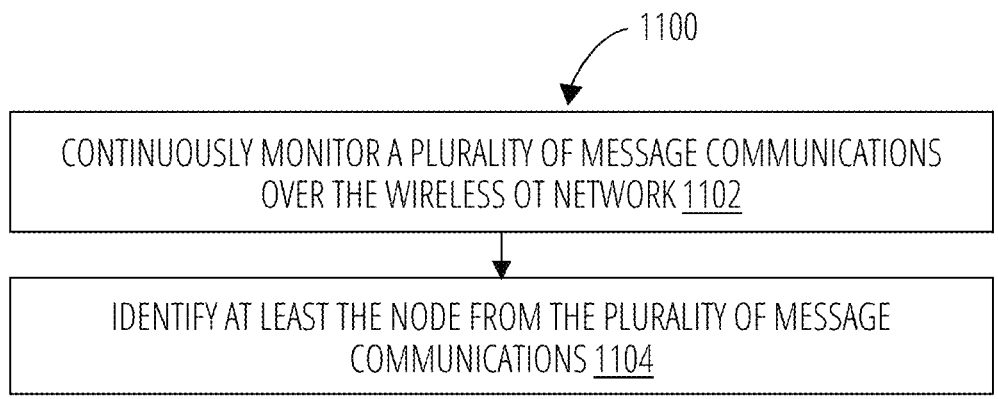
FIG. 11 illustrates a process 1100 embodying a sub-process for managing access of wireless devices to a wireless OT network in accordance with one embodiment.

FIG. 11 illustrates a process 1100 embodying a sub-process for managing access of wireless devices to a wireless OT network in accordance with one embodiment. Specifically, FIG. 11 depicts operations of an example process 1100 for identifying at least one node from message communication(s), for example as a sub-process of for managing access of wireless devices to a wireless OT network. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1100 is described as performed by and from the perspective of the apparatus 200.

The process 1100 begins at operation 1102. In some embodiments, the process 1100 begins after one or more operations depicted and/or described with respect to any of the other processes described herein. For example, in some embodiments as depicted, the process 1100 begins before and/or at execution of operation 1002. In this regard, some or all of the process 1100 may replace or supplement one or more blocks depicted and/or described with respect to any of the other processes described herein. For example, in some embodiments as depicted, the process 1100 supplants, supplements, and/or otherwise replaces an operation of the process 1000, such as operation 1002. Additionally or alternatively, as depicted, upon completion of the process 1100, flow may return to one or more operations of another process. For example, as depicted, flow may return operation 1004 as depicted and described.

According to some examples, the method includes continuously monitoring a plurality of message communications over the wireless OT network at operation 1102. In some embodiments, the apparatus 200 promiscuously detects and/or processes each transmission of data across the wireless OT network. For example, in some embodiments, the apparatus 200 detects each message communication as it reaches the apparatus 200, or related device, for propagation to an intended target endpoint. In some embodiments, the apparatus 200 is disposed within a particular device layer of the wireless OT network to facilitate "listening" to each of the message communications transmitted via the wireless OT network. For example, in some embodiments, the apparatus 200 is disposed in the L3 layer of the wireless OT network to facilitate detection of both wirelessly communicated message communication(s) (e.g., from nodes connected to the wireless OT network via a wireless connection), and/or wired message communication(s) (e.g., from nodes connected to the wireless OT network via a wired connection). It should be appreciated that the wireless OT network may include one or more wirelessly connected devices, or in other embodiments include only wirelessly connected edge devices, and/or the like.

According to some examples, the method includes identifying at least the node from the plurality of message communications at operation 1104. In some embodiments, the apparatus 200 parses and/or extracts particular information from each message communication that identifies the node that originated the message communication. In some embodiments, the apparatus 200 identifies a defined data portion that represents the information identifying the node from each message communication. Additionally or alternatively, in some embodiments, the apparatus 200 identifies and/or parses such information based at least in part on a detected delimiter, keyword, reserved data value, and/or the like from the message communication. In some embodiments, the apparatus 200 parses and/or extracts a device identifier, IP address, MAC address, other node address information, and/or the like that identifies the node. In some embodiments, the apparatus 200 utilizes the information identifying the node for further processing with respect to that node, for example to retrieve particular stored data record(s) associated with that node, identify a current access indicator for the node, generate new data to be associated with the node, and/or the like as described further herein in managing access to the wireless OT network.

Figure 12:
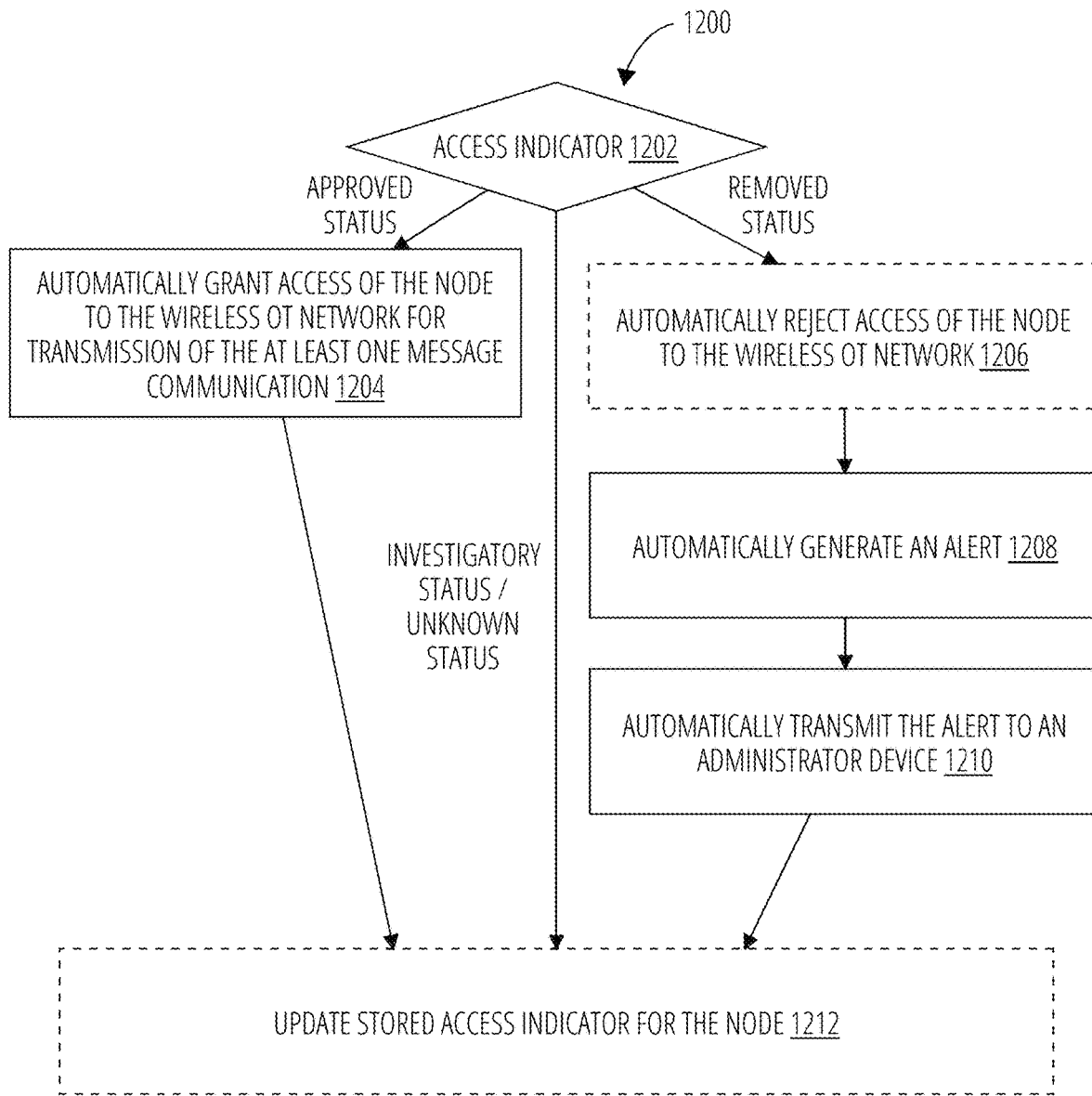
FIG. 12 illustrates a process 1200 embodying a sub-process for managing access of wireless devices to a wireless OT network in accordance with one embodiment.

FIG. 12 illustrates a process 1200 embodying a sub-process for managing access of wireless devices to a wireless OT network in accordance with one embodiment. Specifically, FIG. 12 depicts operations of an example process 1200 for managing network access based at least in part on an access indicator, for example as a sub-process of for managing access of wireless devices to a wireless OT network. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1200 is described as performed by and from the perspective of the apparatus 200.

The process 1200 begins at decision operation 1202. In some embodiments, the process 1200 begins after one or more operations depicted and/or described with respect to any of the other processes described herein. For example, in some embodiments as depicted, the process 1200 after execution of operation 1010. In this regard, some or all of the process 1200 may replace or supplement one or more blocks depicted and/or described with respect to any of the other processes described herein. For example, in some embodiments as depicted, the process 1200 supplants, supplements, and/or otherwise replaces an operation of the process 1000. Additionally or alternatively, as depicted, upon completion of the process 1200, flow may return to one or more operations of another process. For example, as depicted, flow may return to optional operation 1012 as depicted and described.

According to some examples, the method includes determining a status of an access indicator associated with the node at decision operation 1202. In some embodiments, the apparatus 200 retrieves a current access indicator for the node from one or more database(s). In some embodiments, the apparatus 200 queries the database(s) based at least in part on identification information corresponding to the node (e.g., one or more identifier(s)). In some embodiments, the apparatus 200 retrieves the access indicator from a data record of a metadata log database, a node database, and/or a log database accessible to the apparatus 200.

In a circumstance where the access indicator represents an approved status, flow proceeds to a sub-flow for granting access to the network, for example via operation 1204. In a circumstance where the access indicator represents a removed status, flow proceeds to a sub-flow for handling a removed node, for example via optional operation 1206. In a circumstance where the access indicator represents an investigatory status or unknown status, flow proceeds to a sub-flow for processing an unknown node, for example via optional operation 1212. In some embodiments, a node associated with an investigatory status or unknown status is processed automatically, as described herein, and/or via a user interface rendered to an administrator device, for example via the process depicted and described with respect to FIG. 13.

According to some examples, the method includes automatically granting access of the node to the wireless OT network for transmission of the at least one message transmission at operation 1204. In some embodiments, the apparatus 200 enables propagation of the at least one communications network via the network, for example the wireless OT network. Additionally or alternatively, in some embodiments, the apparatus 200 provides one or more data indication(s) to other node(s) on the wireless OT network that indicate approval for transmitting of the at least one message communication via the wireless OT network.

According to some examples, the method includes automatically rejecting access of the node to the wireless OT network at optional operation 1206. In some embodiments, the apparatus 200 prevents propagation of the at least one message communication via the network, for example the wireless OT network. Additionally or alternatively, in some embodiments, the apparatus 200 quarantines or otherwise isolates the node from the wireless OT network. In this regard, the apparatus 200 may prevent the node from completing an intended transmission of a message communication.

According to some examples, the method includes automatically generating an alert at operation 1208. In some embodiments, the alert includes data representing the presence of the removed node associated with the wireless OT network. For example, in some embodiments, the alert includes data identifying the node, data indicating a determination that the node is associated with a removed status, information about the at least one message communication transmitted by the node, and/or the like, that is renderable to an administrator device based at least in part on such data.

According to some examples, the method includes automatically transmitting the alert to an administrator device at operation 1210. In some embodiments, the apparatus 200 transmits the alert via one or more message communication(s) over the wireless OT network. In some embodiments, the apparatus 200 transmits the alert via an external network, for example the Internet. In some embodiments, the transmission of the alert causes the administrator device to render a user interface based at least in part on the alert. For example, in some embodiments, the alert may cause the administrator device to render a user interface that includes interface elements for viewing the data provided within the alert, and/or update an access indicator associated with the node (e.g., to an approved status for example), and/or to keep the access indicator the same.

According to some examples, the method includes updating stored access indicator for the node at optional operation 1212. In some embodiments, the updating of the stored access indicator is based at least in part on user engagement from the administrator device. For example, in some embodiments, the apparatus 200 updates the stored access indicator associated with the node to an updated value based at least in part on an updated access indicator received based at least in part on the user engagement, for example to newly update the access indicator to represent an approved status.

In some embodiments, the apparatus 200 updates one or more data value(s) of one or more data record(s) associated with the node to update the stored access indicator for the node.

Figure 13:
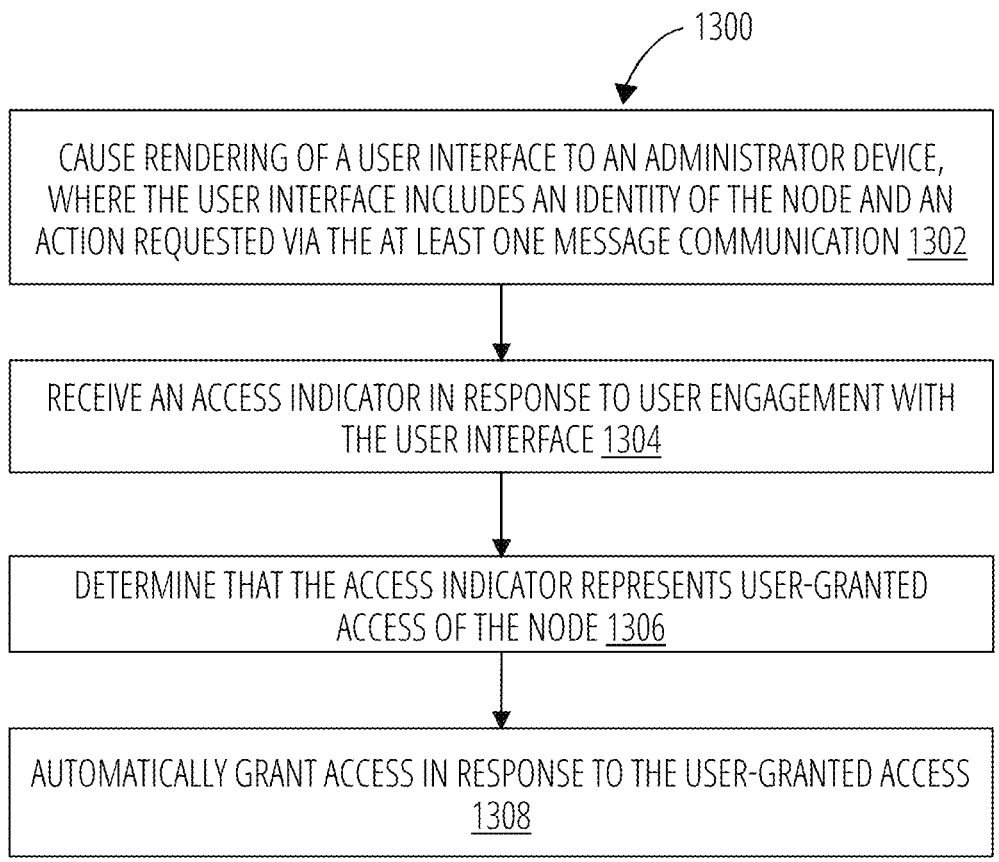
FIG. 13 illustrates a process 1300 embodying a sub-process for managing access of wireless devices to a wireless OT network in accordance with one embodiment.

FIG. 13 illustrates a process 1300 embodying a sub-process for managing access of wireless devices to a wireless OT network in accordance with one embodiment.

Specifically, FIG. 13 depicts operations of an example process 1300 for providing user-granted access to a network, for example as a sub-process of for managing access of wireless devices to a wireless OT network. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1300 is described as performed by and from the perspective of the apparatus 200.

The process 1300 begins at operation 1302. In some embodiments, the process 1300 begins after one or more operations depicted and/or described with respect to any of the other processes described herein. For example, in some embodiments as depicted, the process 1300 after execution of operation 1010. In this regard, some or all of the process 1300 may replace or supplement one or more blocks depicted and/or described with respect to any of the other processes described herein. For example, in some embodiments as depicted, the process 1300 supplants, supplements, and/or otherwise replaces an operation of the process 1000, such as the optional operation 1012. Additionally or alternatively, as depicted, upon completion of the process 1300, flow may return to one or more operations of another process.

According to some examples, the method includes causing rendering of a user interface to an administrator device at operation 1302. In some embodiments, the user interface includes an identity of the node and an action requested via the at least one message communication, for example in one or more interface elements of the provided user interface. In some embodiments, the apparatus 200 transmits particular data to cause rendering of the user interface via the administrator device. For example, in some embodiments, the apparatus 200 generates and/or transmits, to the administrator device, data that represents the an identity of the node and/or data representing the action requested, wherein such data transmission(s) cause the administrator device to render the corresponding user interface to a display communicatively coupled with the administrator device. The user interface may embody a native interface of a user-facing application corresponding to functionality of the apparatus 200, a web interface provided via a browser application utilized to access functionality of the apparatus 200, and/or the like. In some embodiments, the user interface includes data rendered through a third-party application, for example an email notification, a message notification, a push notification, and/or the like.

According to some examples, the method includes receiving an access indicator in response to user engagement with the user interface at operation 1304. In some embodiments, the user interface includes one or more interface element(s) that are engageable by a user to provide particular input associated with managing access of the node to a network. For example, in some embodiments, the user interface includes at least a first user interface component that, in response to user engagement, enables inputting of an approval of access to the network, and a second user interface component that, in response to user engagement, enables inputting of a rejection of access to the network. In this regard, the apparatus 200 may receive an access indicator from the administrator device in response to user engagement with one or more user interface component(s) of the user interface. For example, in some embodiments, the apparatus 200 receives an access indicator representing an approved status in response to user engagement with a first interface element of the user interface, or receives an access indicator representing a removed status in response to user engagement with a second interface element of the user interface.

According to some examples, the method includes determining that the access indicator represents user-granted access of the node at operation 1306. For example, in some embodiments, the apparatus 200 compares data value of the access indicator with a determined data value representing an approved status. In a circumstance where the comparison indicates a match, the apparatus 200 may determine that the access indicator received from the administrator device represents an approved status. Additionally or alternatively, in a circumstance where the comparison indicates that the data value of the received access indicator does not match the determined data value representing the approved status, the apparatus 200 may determine that the received access indicator represents a removed status.

According to some examples, the method includes automatically granting access in response to the user-granted access at operation 1308. In some embodiments, the apparatus 200 generates one or more data record(s) including an access indicator including an approved node. Additionally or alternatively, in some embodiments, the apparatus 200 updates one or more data record(s) to reflect an approved status as an access indicator associated with the node. In some embodiments, the apparatus 200 generates and/or stores an administrator log to one or more database(s), for example a log database, that indicates the node has been updated to an approved status in response to receiving the access indicator from the administrator device.

Figure 14:
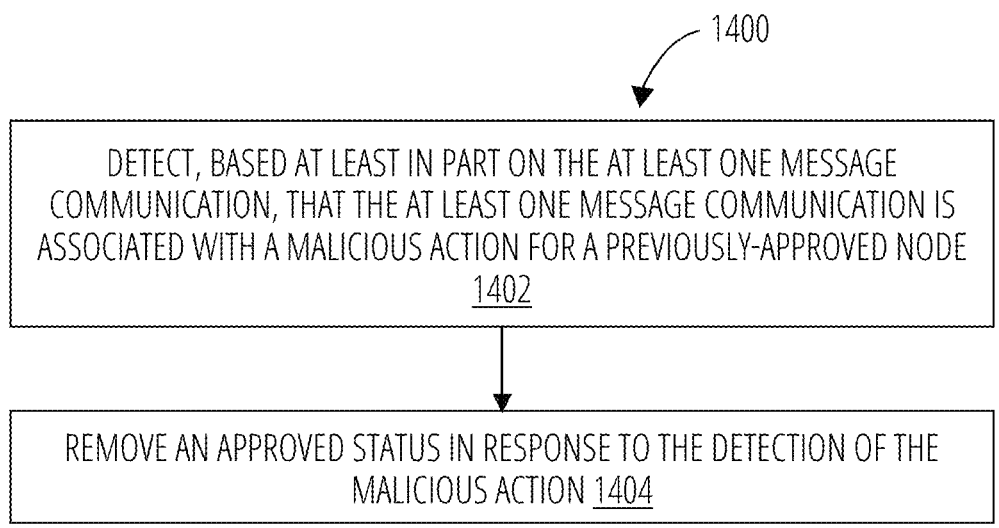
FIG. 14 illustrates a process 1400 embodying a sub-process for managing access of wireless devices to a wireless OT network in accordance with one embodiment.

FIG. 14 illustrates a process 1400 embodying a sub-process for managing access of wireless devices to a wireless OT network in accordance with one embodiment. Specifically, FIG. 14 depicts operations of an example process 1400 for removing access for a particular node based at least in part on detection of a malicious action, for example as a sub-process of for managing access of wireless devices to a wireless OT network. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1400 is described as performed by and from the perspective of the apparatus 200.

The process 1400 begins at operation 1402. In some embodiments, the process 1400 begins after one or more operations depicted and/or described with respect to any of the other processes described herein. For example, in some embodiments as depicted, the process 1400 after execution of operation 1010. In this regard, some or all of the process 1400 may replace or supplement one or more blocks depicted and/or described with respect to any of the other processes described herein. For example, in some embodiments as depicted, the process 1400 supplants, supplements, and/or otherwise replaces an operation of the process 1000. Additionally or alternatively, as depicted, upon completion of the process 1400, flow may return to one or more operations of another process. For example, as depicted, flow may return to optional operation 1012 as depicted and described.

According to some examples, the method includes detecting, based at least in part on the at least one message communication, that the at least one message communication is associated with a malicious action for a previously-approved node at operation 1402. In some embodiments, for example, the apparatus 200 identifies a particular node that originated or otherwise is associated with transmission of the at least one message communication from data parsed from the at least one message communication (e.g., a MAC address and/or IP address, and/or the like). In some embodiments, the apparatus 200 determines whether the at least one message communication is associated with an action for which the node that initiated the at least one message communication is not authorized. Alternatively or additionally, in some embodiments, the apparatus 200 determines that the at least one message communication indicates a malicious action in a circumstance where data parsed from and/or otherwise determined associated with the at least one message communication satisfies one or more defined rule(s) that indicate a malicious action. Additionally or alternatively, in some embodiments, the apparatus 200 retrieves a stored access indicator associated with the node and determines that the node is associated with an approved status based at least in part on the access indicator.

According to some examples, the method includes removing an approved status in response to the detection of the malicious action at operation 1404. In some embodiments, the apparatus 200 deletes one or more data record(s) associated with the node to revoke the approved status. Additionally or alternatively, in some embodiments, the apparatus 200 updates an access indicator associated with the node to a removed status in one or more data record(s). In some embodiments, the removed status associated with the node prevents further access to the network (e.g., an OT network), certain parts of the network, and/or certain functionality of the network, based on the updated status value.

Figure 15:
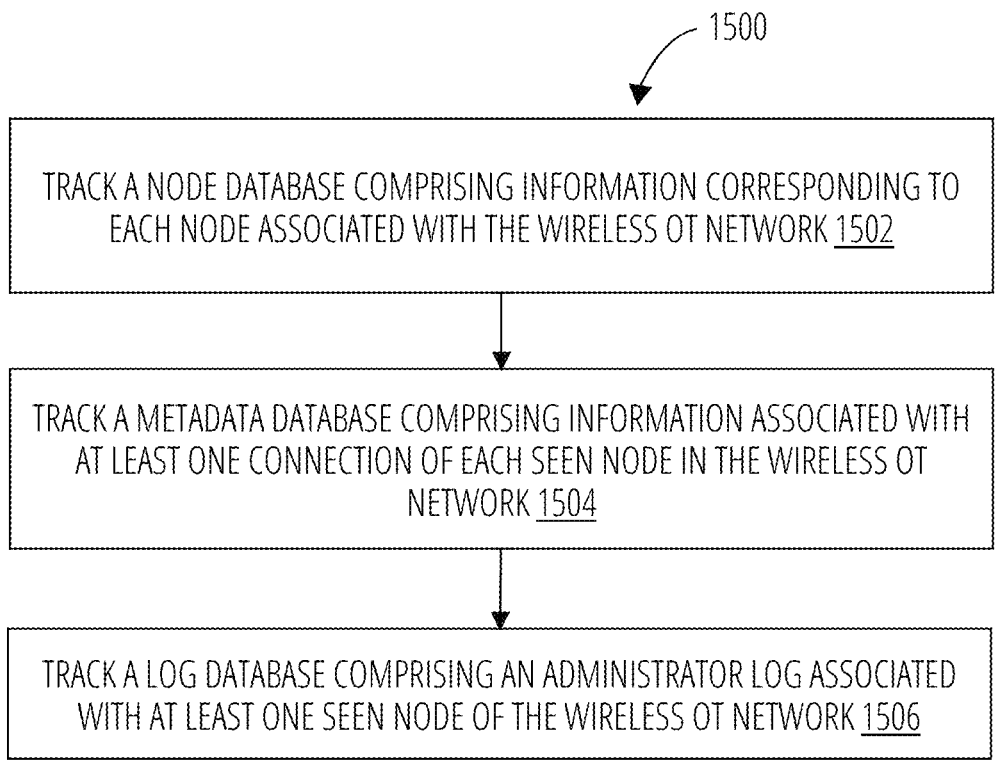
FIG. 15 illustrates a process 1500 embodying a sub-process for managing access of wireless devices to a wireless OT network in accordance with one embodiment.

FIG. 15 illustrates a process 1500 embodying a sub-process for managing access of wireless devices to a wireless OT network in accordance with one embodiment. Specifically, FIG. 15 depicts operations of an example process 1500 for tracking specially configured database(s) for managing access to a network, for example as a sub-process of for managing access of wireless devices to a wireless OT network. In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1500 is described as performed by and from the perspective of the apparatus 200.

The process 1500 begins at operation 1502. In some embodiments, the process 1500 begins after one or more operations depicted and/or described with respect to any of the other processes described herein. For example, in some embodiments as depicted, the process 1500 after execution of operation 1002. In this regard, some or all of the process 1500 may replace or supplement one or more blocks depicted and/or described with respect to any of the other processes described herein. For example, in some embodiments as depicted, the process 1500 supplants, supplements, and/or otherwise replaces an operation of the process 1000. Additionally or alternatively, as depicted, upon completion of the process 1500, flow may return to one or more operations of another process. For example, as depicted, flow may return to operation 1004 as depicted and described.

According to some examples, the method includes tracking a node database comprising information corresponding to each node associated with the wireless OT network at operation 1502. In some embodiments, the node database comprises information identifying each node connected to a particular network, such as an OT network, each node attempting to connect to a particular network, and/or each node associated with an approved status for connection to the network. In some embodiments, the node database includes one or more data records indicating such data for each node. Non-limiting examples of data stored to a data record of the node database include a device identifier, node address information (e.g., MAC address information, IP address information, hostname information, and/or the like), a vendor indicator, operating system data, TCP transfer data, UDP transfer data, configuration data, settings data, and/or services data associated with a particular node. In some embodiments, the apparatus 200 tracks the node database by parsing such information from one or more message communication(s) transmitted via the network, and parsing such data from the message communication(s) for storing to the node database.

According to some examples, the method includes tracking a metadata database comprising information associated with at least one connection of each seen node in the wireless OT network at operation 1504. In some embodiments, the metadata database comprises metadata associated with each node connected to the particular network, each node attempting to connect to the particular network and/or each node associated with an approved status for connection to the network. In some embodiments, the metadata database includes one or more data records indicating such data for each node. Non-limiting examples of data stored to a data record of the metadata database include a device identifier for a node, an access indicator corresponding to the node, resolution information, a first seen indicator, a last seen indicator, a last updated indicator, connected switch information, and/or the like. In some embodiments, the apparatus 200 tracks the metadata database by parsing information from one or more message communication(s) transmitted via the network, and parsing such metadata from the message communication(s) for storing to the metadata database.

According to some examples, the method includes tracking a log database comprising an administrator log associated with at least one seen node of the wireless OT network at operation 1506. In some embodiments, the log database includes administrator logs representing operations performed by each particular node, for example with respect to connections to the network, administrator actions associated with the node, and/or the like. In some embodiments, the log database comprises administrator log(s) associated with each node connected to the particular network, each node attempting to connect to the particular network, and/or each node associated with an approved status for connection to the network. In some embodiments, the log database includes one or more data records indicating such data for each node. Non-limiting examples of administrator log(s) stored to data record of the log database includes a device identifier for a node, a timestamp associated with an action, administrator identification information for an administrator that performed an action associated with the node, an access indicator corresponding to the node at the time of the operation, note data from the administrator that performed an operation with respect to the node, and/or the like. In some embodiments, the apparatus 200 tracks the log database by storing each log created by or in response to an administrator input, and/or an automatically generated log from the apparatus 200.

In some embodiments, each of the node database, metadata database, and/or log database is represented by a file having a defined filename, for example stored to and/or otherwise maintained in a file system via the apparatus 200. In some embodiments, such databases are maintained via any of a myriad of database implementations accessible to the apparatus 200. Additionally or alternatively, in some embodiments, each of the node database, metadata database, and/or log database is embodied as a separate data repository. In some embodiments, such databases are embodied as sub-databases of a combined data repository, and/or as tables of a particular data repository. In some embodiments, each data record of one of more of the node database, metadata database, and/or log database is embodied by a JSON object for retrieval and/or transmission. It will be appreciated that each data record in other embodiments may be represented utilizing any other of a myriad of data object representations, including human-readable and non-human-readable implementations.

Figure 16:
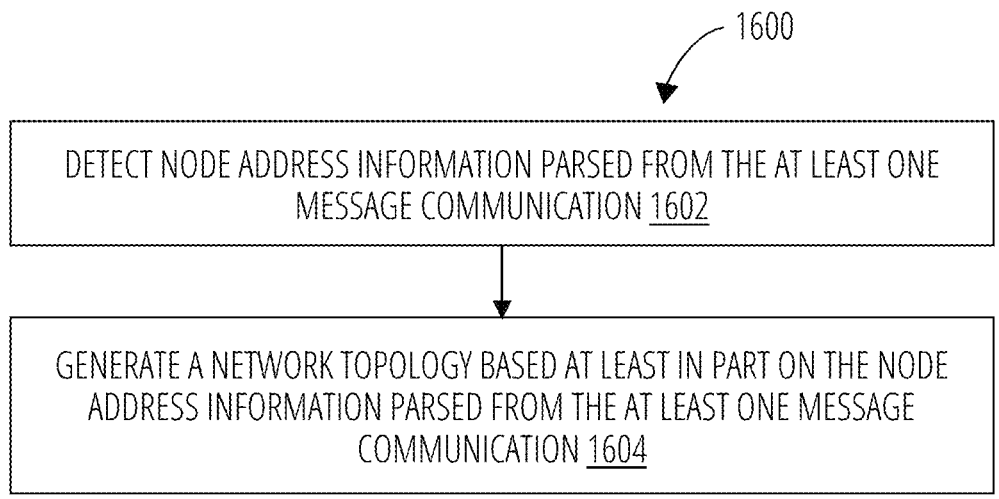
FIG. 16 illustrates a process 1600 embodying a sub-process for managing access of wireless devices to a wireless OT network in accordance with one embodiment.

FIG. 16 illustrates a process 1600 embodying a sub-process for managing access of wireless devices to a wireless OT network in accordance with one embodiment. Specifically, FIG. 16 depicts operations of an example process 1600 for improved generating a network topology based at least in part on tracked data, for example as a sub-process of for managing access of wireless devices to a wireless OT network. In some embodiments, the process 1600 is embodied by computer program code stored on a non-transitory computer-readable storage medium of a computer program product configured for execution to perform the process as depicted and described. Alternatively or additionally, in some embodiments, the process 1600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1600 is described as performed by and from the perspective of the apparatus 200.

The process 1600 begins at operation 1502. In some embodiments, the process 1600 begins after one or more operations depicted and/or described with respect to any of the other processes described herein. For example, in some embodiments as depicted, the process 1600 after execution of operation 1002. In this regard, some or all of the process 1600 may replace or supplement one or more blocks depicted and/or described with respect to any of the other processes described herein. For example, in some embodiments as depicted, the process 1600 supplants, supplements, and/or otherwise replaces an operation of the process 1000. Additionally or alternatively, as depicted, upon completion of the process 1600, flow may return to one or more operations of another process. For example, as depicted, flow may return to operation 1004 as depicted and described.

According to some examples, the method includes detecting node address information parsed from the at least one message communication at operation 1602. In some embodiments, the node address information includes or is embodied by MAC address data associated with a particular node. In some embodiments, the apparatus 200 stores such node address information as it is parsed from one or more communications network collected from the network, for example a wireless OT network, in a particular database accessible to the apparatus 200. In some such embodiments, the apparatus 200 may retrieve such node address information from the database for each detected or known node of the network at a particular future timestamp. For example, in some embodiments, the apparatus 200 receives user input embodying a request to initiate generation of the network topology. Additionally or alternatively, in some embodiments, the apparatus 200 automatically initiates generation of the network topology based at least in part on one or more data-driven trigger(s), for example at a particular timestamp interval, satisfaction of defined data-driven condition(s), and/or the like.

According to some examples, the method includes generating a network topology based at least in part on the node address information parsed from the at least one message communication at operation 1604. In some embodiments, the apparatus 200 generates the network topology based on the node address information for a particular node as parsed particular the at least one message communication, and a plurality of other node address information for other nodes detected as connected to or otherwise known to be connected to the particular network. In some embodiments for example, the apparatus 200 retrieves such other node address information from a particular database that stores such data upon identification, collection, and/or generation of the other node address information by the apparatus 200. In some embodiments, the apparatus 200 parses the other node address information for each other node based at least in part on message communication(s) transmitted from and/or via such other node(s). In some embodiments, each portion of node address information includes MAC address information, connections between node(s) and particular switch(es), and/or MAC address port(s) for each switch embodying a node of the network. In some embodiments, the apparatus 200 processes such node address information to map the network topology embodying the existence of each node of the network and the connections between each of such node(s) (e.g., based at least in part on the MAC address information, MAC address ports for each switch, and/or the like).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for managing access of wireless nodes to a wireless operational technology (OT) network comprising:
   detecting a node from at least one message communication over a wireless OT network;
   tracking a node database comprising information corresponding to one or more nodes associated with the wireless OT network, a metadata database comprises information associated with at least one connection of one or more seen nodes of the wireless OT network, and a log database comprising an administrator log associated with at least one of the one or more seen nodes of the wireless OT network;
   authenticating node identification information that uniquely identifies the node;
   confirming that the node is permissioned to access the wireless OT network by at least validating authentication information associated with the node;
   confirming that the node is attempting an authorized action by at least validating authorization information associated with the at least one message communication; and
   assigning an access indicator based at least in part on the authenticating of the node identification information, the validating of the authentication information, and the validating of the authorization information.

2. The computer-implemented method of claim 1, wherein detecting the node comprises:
   continuously monitoring a plurality of message communications over the wireless OT network; and
   identifying at least the node from the plurality of message communications.

3. The computer-implemented method of claim 1, wherein in a circumstance where the access indicator represents an approved status, the computer-implemented method further comprises:
   automatically granting access of the node to the wireless OT network for transmission of the at least one message communication.

4. The computer-implemented method of claim 1, wherein in a circumstance where the access indicator represents a removed status, the computer-implemented method further comprising:
  automatically generating an alert; and
  automatically transmitting the alert to an administrator device.

5. The computer-implemented method of claim 1, further comprising:
  receiving an indication of a user-granted access of the node; and
  automatically granting access to the node in response to the user-granted access.

6. The computer-implemented method of claim 1, further comprising:
  causing rendering of a user interface to an administrator device, wherein the user interface comprises an identity of the node and an action requested via the at least one message communication; and
  receiving the access indicator in response to user engagement with the user interface.

7. The computer-implemented method of claim 1, wherein the computer-implemented method is performed by a processor disposed in a L3 layer of the wireless OT network.

8. The computer-implemented method of claim 1, wherein the node identification information comprises a MAC address and an IP address associated with the node, wherein the MAC address and the IP address are authenticated via at least one of the node database, the metadata database, the log database, or one or more other database.

9. The computer-implemented method of claim 1, further comprising:
  detecting, based at least in part on the at least one message communication, that the at least one message communication is associated with a malicious action for an approved node; and
  removing an approved status in response to the detection of the malicious action.

10. The computer-implemented method of claim 1, further comprising:
  maintaining a database comprising a plurality of approved node; and
  determining that the node identification information associated with the node is not found in the database.

11. The computer-implemented method of claim 1, further comprising:
  generating a network topology based at least in part on node address information parsed from the at least one message communication.

12. The computer-implemented method of claim 1, further comprising:
  causing rendering of a user interface comprising at least one unknown node associated with the wireless OT network.

13. The computer-implemented method of claim 1, further comprising:
  causing rendering of a user interface comprising at least one node associated with an investigatory status associated with the wireless OT network.

14. A computing apparatus comprising:
  a processor; and
  a memory storing instructions that, when executed by the processor, configure the apparatus to:
    detect a node from at least one message communication over a wireless OT network;
    track a node database comprising information corresponding to one or more nodes associated with the wireless OT network, a metadata database comprises information associated with at least one connection of one or more seen nodes of the wireless OT network, and a log database comprising an administrator log associated with at least one of the one or more seen nodes of the wireless OT network;
    authenticate node identification information that uniquely identifies the node;
    confirm that the node is permissioned to access the wireless OT network by at least validating authentication information associated with the node;
    confirm that the node is attempting an authorized action by at least validating authorization information associated with the at least one message communication; and
    assign an access indicator based at least in part on the authenticating of the node identification information, the validating of the authentication information, and the validating of the authorization information.

15. The computing apparatus of claim 14, wherein the instructions further configure the apparatus to:
  generate a network topology based at least in part on node address information parsed from the at least one message communication.

16. The computing apparatus of claim 14, wherein, in a circumstance where the access indicator represents a removed status, the instructions further configure the apparatus to:
  automatically generate an alert; and
  automatically transmit the alert to an administrator device.

17. The computing apparatus of claim 14, wherein detecting the node comprises:
  continuously monitor a plurality of message communications over the wireless OT network; and
  identify at least the node from the plurality of message communications.

18. A computer program product comprising at least one non-transitory computer-readable storage medium including instructions that, when executed by at least one processor, configures the at least one processor for:
  detecting a node from at least one message communication over a wireless OT network;
  tracking a node database comprising information corresponding to one or more nodes associated with the wireless OT network, a metadata database comprises information associated with at least one connection of one or more seen nodes of the wireless OT network, and a log database comprising an administrator log associated with at least one of the one or more seen nodes of the wireless OT network;
  authenticating node identification information that uniquely identifies the node;
  confirming that the node is permissioned to access the wireless OT network by at least validating authentication information associated with the node;
  confirming that the node is attempting an authorized action by at least validating authorization information associated with the at least one message communication; and
  assigning an access indicator based at least in part on the authenticating of the node identification information, the validating of the authentication information, and the validating of the authorization information.

\* \* \* \* \*